(12) United States Patent
Thimbleby et al.

(10) Patent No.: US 8,209,630 B2
(45) Date of Patent: Jun. 26, 2012

(54) DEVICE, METHOD, AND GRAPHICAL USER INTERFACE FOR RESIZING USER INTERFACE CONTENT

(75) Inventors: Will John Thimbleby, Sunnyvale, CA (US); Jay Christopher Capela, Santa Cruz, CA (US); Christopher Douglas Weeldreyer, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 345 days.

(21) Appl. No.: 12/694,215

(22) Filed: Jan. 26, 2010

(65) Prior Publication Data

US 2011/0185317 A1    Jul. 28, 2011

(51) Int. Cl.
*G06F 3/048*    (2006.01)

(52) U.S. Cl. ........ 715/801; 715/788; 715/800; 715/815; 715/863; 345/660; 345/662

(58) Field of Classification Search ................... 715/863, 715/788, 800, 801, 815; 345/660, 661, 662, 345/670, 671
See application file for complete search history.

(56) References Cited

U.S. PATENT DOCUMENTS

| | | | | |
|---|---|---|---|---|
| 5,359,703 | A | | 10/1994 | Robertson et al. ............. 395/119 |
| 5,581,670 | A | | 12/1996 | Bier et al. ...................... 395/326 |
| 5,675,753 | A | * | 10/1997 | Hansen et al. ................. 715/744 |
| 5,729,673 | A | * | 3/1998 | Cooper et al. ................. 345/427 |
| 6,065,021 | A | * | 5/2000 | George ........................... 715/245 |
| 6,323,846 | B1 | | 11/2001 | Westerman et al. ........... 345/173 |
| 6,392,673 | B1 | * | 5/2002 | Andrew et al. ................ 715/800 |
| 6,480,813 | B1 | * | 11/2002 | Bloomquist et al. .............. 703/1 |
| 6,570,557 | B1 | | 5/2003 | Westerman et al. ........... 345/173 |
| 6,677,932 | B1 | | 1/2004 | Westerman ..................... 345/173 |
| 6,888,536 | B2 | | 5/2005 | Westerman et al. ........... 345/173 |
| 7,110,005 | B2 | * | 9/2006 | Arvin et al. .................... 345/619 |
| 7,190,379 | B2 | * | 3/2007 | Nissen ........................... 345/660 |
| 7,216,293 | B2 | * | 5/2007 | Kataoka et al. ................ 715/246 |
| 7,218,226 | B2 | | 5/2007 | Wehrenberg ................... 340/571 |
| 7,287,241 | B2 | * | 10/2007 | Balsiger ......................... 717/105 |
| 7,469,833 | B1 | | 12/2008 | Kelley et al. ............. 235/462.01 |
| 7,489,324 | B2 | * | 2/2009 | Royal et al. .................... 345/667 |
| 7,614,008 | B2 | | 11/2009 | Ording .......................... 715/773 |
| 7,633,076 | B2 | | 12/2009 | Huppi et al. .............. 250/559.36 |
| 7,653,883 | B2 | | 1/2010 | Hotelling et al. .............. 715/863 |
| 7,657,849 | B2 | | 2/2010 | Chaudhri et al. .............. 715/863 |
| 7,663,607 | B2 | | 2/2010 | Hotelling et al. .............. 345/173 |
| 7,688,306 | B2 | | 3/2010 | Wehrenberg et al. .......... 345/158 |
| 7,694,231 | B2 | | 4/2010 | Kocienda et al. .............. 715/773 |
| 7,904,810 | B2 | * | 3/2011 | Chen et al. ..................... 715/268 |
| 8,023,158 | B2 | * | 9/2011 | Maki et al. .................... 358/3.26 |
| 8,095,884 | B2 | * | 1/2012 | Karunakaran et al. ......... 715/768 |
| 2003/0210268 | A1 | * | 11/2003 | Kataoka et al. ................ 345/762 |

(Continued)

*Primary Examiner* — Weilun Lo
*Assistant Examiner* — Rashedul Hassan
(74) *Attorney, Agent, or Firm* — Morgan, Lewis & Bockius LLP

(57) ABSTRACT

Aspect ratio locking alignment guides for gestures are disclosed. In one embodiment, a gesture is detected to resize a user interface element, and in response, a first alignment guide is visibly displayed, wherein the first alignment guide includes positions representing different sizes the user interface element can be resized to while maintaining the initial aspect ratio of the user interface element. While the user interface element is resized in accordance with the user gesture, and while the first alignment guide is visibly displayed: when the user gesture is substantially aligned with the first alignment guide, visible display of the first alignment guide is maintained; and when the user gesture substantially deviates from the first alignment guide, visible display of the first alignment guide is terminated.

20 Claims, 24 Drawing Sheets

U.S. PATENT DOCUMENTS

| | | | |
|---|---|---|---|
| 2005/0108656 A1* | 5/2005 | Wu et al. | 715/801 |
| 2006/0033724 A1 | 2/2006 | Chaudhri et al. | 345/173 |
| 2006/0085757 A1 | 4/2006 | Andre et al. | 715/771 |
| 2006/0161870 A1 | 7/2006 | Hotelling et al. | 715/863 |
| 2006/0197753 A1 | 9/2006 | Hotelling | 345/173 |
| 2007/0079236 A1 | 4/2007 | Schrier et al. | 715/517 |
| 2007/0152980 A1 | 7/2007 | Kocienda et al. | 345/173 |
| 2007/0257890 A1 | 11/2007 | Hotelling et al. | 345/173 |
| 2008/0022197 A1 | 1/2008 | Bargeron et al. | 715/246 |
| 2008/0072173 A1* | 3/2008 | Brunner et al. | 715/788 |
| 2008/0140868 A1 | 6/2008 | Kalayjian et al. | 710/8 |
| 2008/0167834 A1 | 7/2008 | Herz et al. | 702/150 |
| 2008/0244410 A1* | 10/2008 | Schormann | 715/723 |
| 2008/0267468 A1 | 10/2008 | Geiger et al. | 382/128 |
| 2008/0320391 A1 | 12/2008 | Lemay et al. | 715/702 |
| 2009/0051946 A1* | 2/2009 | Hibi | 358/1.9 |
| 2009/0231275 A1 | 9/2009 | Odgers | 345/157 |
| 2009/0256857 A1* | 10/2009 | Davidson et al. | 345/619 |
| 2009/0259964 A1* | 10/2009 | Davidson et al. | 715/788 |
| 2010/0002002 A1* | 1/2010 | Lipsky et al. | 345/441 |
| 2010/0325529 A1* | 12/2010 | Sun | 715/234 |
| 2011/0145759 A1* | 6/2011 | Leffert et al. | 715/800 |

* cited by examiner

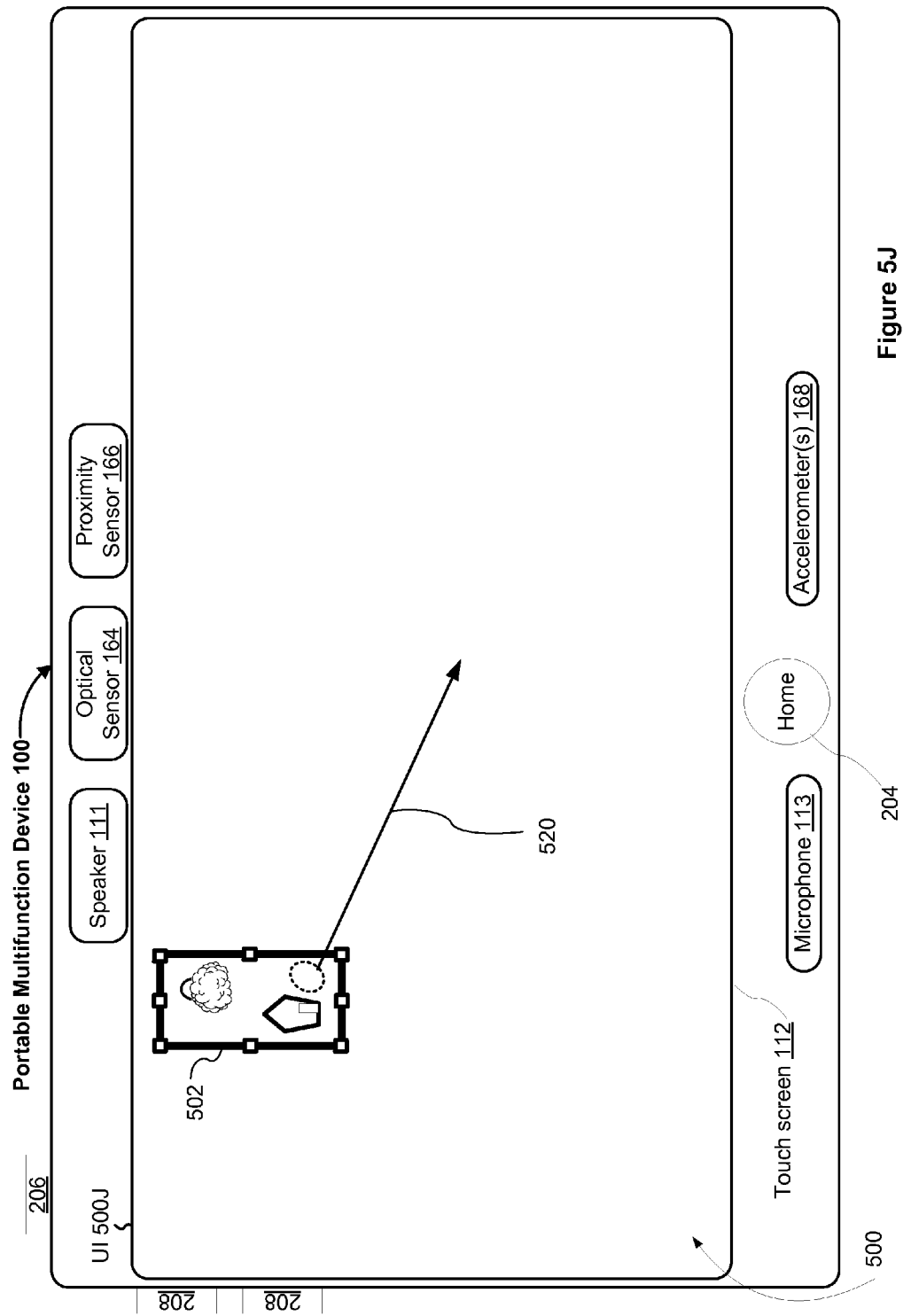

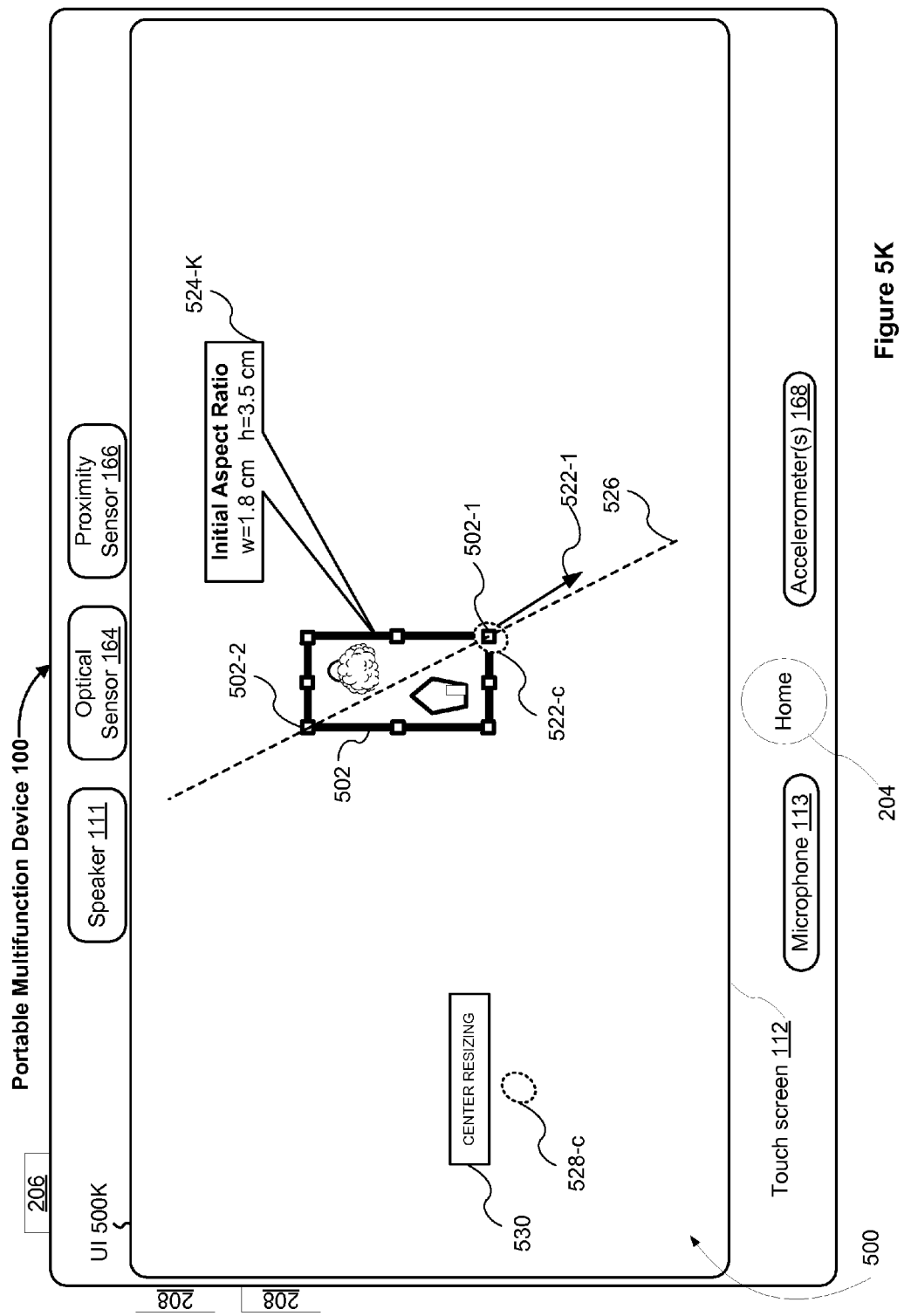

600

┌─────────────────────────────────────────────────────────────────────┐
│ At a computing device with a display and one or more user input devices adapted │
│ to detect user gestures, display on the display a user interface including at least │
│ one user interface element, wherein the user interface element has an initial │
│ aspect ratio, and the user interface element is configured to be resized within the │
│ user interface in response to user gestures detected with the one or more user │ ─ 602
│ input devices. │
│ ┌─────────────────────────────────────────────────────────────────┐ ─ 604
│ │ The user interface element is displayed on an electronic canvas. │ │
│ └─────────────────────────────────────────────────────────────────┘ ─ 606
│ ┌─────────────────────────────────────────────────────────────────┐ │
│ │ The display and at least one of the one or more user input devices comprise a │ │
│ │ touch-screen display. │ │
│ └─────────────────────────────────────────────────────────────────┘ │
└─────────────────────────────────────────────────────────────────────┘

┌─────────────────────────────────────────────────────────────────────┐
│ Detect a user gesture, the user gesture corresponding to a gesture to resize the │ ─ 608
│ user interface element within the user interface, wherein the user gesture includes │
│ one or more directional movements within the user interface. │ ─ 610
│ ┌─────────────────────────────────────────────────────────────────┐ │
│ │ While detecting the user gesture, display an affordance in conjunction with the │ │
│ │ user interface element being resized, wherein the affordance is configured to │ │
│ │ display at least a current size of the user interface element. │ │
│ └─────────────────────────────────────────────────────────────────┘ ─ 612
│ ┌─────────────────────────────────────────────────────────────────┐ │
│ │ While detecting the user gesture, display an affordance in conjunction with the │ │
│ │ user interface element being resized, wherein the affordance is configured to │ │
│ │ display a description of the user interface element when the user interface │ │
│ │ element is resized to a set of predefined proportions. │ │
│ └─────────────────────────────────────────────────────────────────┘ ─ 614
│ ┌─────────────────────────────────────────────────────────────────┐ │
│ │ While detecting the user gesture, display an affordance in conjunction with the │ │
│ │ user interface element being resized, wherein the affordance is configured to │ │
│ │ display a graphic depiction of a specific form of the user interface element │ │
│ │ when the user interface element is resized to a set of predefined proportions. │ │
│ └─────────────────────────────────────────────────────────────────┘ │
└─────────────────────────────────────────────────────────────────────┘

In response to detecting the user gesture:

While resizing the user interface element within the user interface, and after the visible display of the first alignment guide is terminated: when the user gesture intersects an axis corresponding to a 1:1 aspect ratio for the user interface element, visibly display a 1:1 aspect ratio alignment guide in conjunction with the user interface element, wherein the 1:1 aspect ratio alignment guide includes positions representing different sizes the user interface element can be resized to while maintaining the user interface element in a 1:1 aspect ratio; while the 1:1 aspect ratio alignment guide is visibly displayed: when the user gesture is substantially aligned with the 1:1 aspect ratio alignment guide, maintain visible display of the 1:1 aspect ratio alignment guide; and when the user gesture substantially deviates from the 1:1 aspect ratio alignment guide, terminate visible display of the 1:1 aspect ratio alignment guide — 628

After the visible display of the 1:1 aspect ratio alignment guide is terminated: when the user gesture intersects the first alignment guide, visibly redisplay the first alignment guide in conjunction with the user interface element; and when the user gesture intersects the 1:1 aspect ratio alignment guide, visibly redisplay the 1:1 aspect ratio alignment guide in conjunction with the user interface element. — 630

While the user interface element is less than a predefined size, and the user gesture is substantially aligned with the first alignment guide: confine the resizing of the user interface element to locations on the first alignment guide unless the user gesture deviates more than a predefined distance threshold away from the first alignment guide. — 632

While the user interface element is less than a predefined size, and the user gesture is substantially aligned with the 1:1 aspect ratio alignment guide: confine the resizing of the user interface element to locations on the 1:1 aspect ratio alignment guide unless the user gesture deviates more than a predefined distance threshold away from the 1:1 aspect ratio alignment guide. — 634

In response to detecting the user gesture:

While detecting the user gesture: detect a second user gesture; display a center resize affordance; resize the user interface element within the user interface in accordance with the user gesture, wherein the resizing is performed with respect to a center of the user interface element. — 636

Figure 6C

DEVICE, METHOD, AND GRAPHICAL USER INTERFACE FOR RESIZING USER INTERFACE CONTENT

TECHNICAL FIELD

The disclosed embodiments relate generally to computing devices, including but not limited to, computing devices and methods for managing user interface content and user interface elements.

BACKGROUND

The use of computers and other electronic computing devices to manage user interface content and user interface elements has increased significantly in recent years. Exemplary computing devices that include capabilities of managing user interface content and user interface elements include mobile telephones, desktop computers, laptop computers, tablet computers, electronic book readers, consumer electronics, personal digital assistants, etc.

Many users rely on electronic computing devices for managing user interface content and user interface elements. Unfortunately, existing methods for managing user interface content and user interface elements are cumbersome and inefficient. In addition, existing methods take longer than necessary, thereby wasting energy. This latter consideration is particularly important in battery-operated devices.

Accordingly, there is a need for computing devices with faster, more efficient methods and interfaces for managing user interface content and user interface elements, such as using aspect ratio locking alignment guides during user interface element resizing gestures. Such methods and interfaces may complement or replace conventional methods for managing user interface content and user interface elements. Such methods and interfaces reduce the cognitive burden on a user and produce a more efficient human-machine interface. For battery-operated computing devices, such methods and interfaces conserve power and increase the time between battery charges.

SUMMARY

The above deficiencies and other problems associated with user interfaces for computing devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital video recording, web browsing, digital music playing, and/or digital video playing. Executable instructions for performing these functions may be included in a computer readable storage medium or other computer program product configured for execution by one or more processors.

In accordance with some embodiments, a method is performed at a computing device with a display and one or more user input devices. The method includes: at a computing device with a display and one or more user input devices adapted to detect user gestures displaying on the display a user interface including at least one user interface element, wherein the user interface element has an initial aspect ratio, and the user interface element is configured to be resized within the user interface in response to user gestures detected with the one or more user input devices; detecting a user gesture, the user gesture corresponding to a gesture to resize the user interface element within the user interface, wherein the user gesture includes one or more directional movements within the user interface; in response to detecting the user gesture: visibly displaying in conjunction with the user interface element at least a first resize handle; visibly displaying a first alignment guide that bisects the user interface element and the first resize handle, wherein the first alignment guide includes positions representing different sizes the user interface element can be resized to while maintaining the initial aspect ratio of the user interface element; resizing the user interface element within the user interface in accordance with the user gesture; while resizing the user interface element within the user interface: while the first alignment guide is visibly displayed: when the user gesture is substantially aligned with the first alignment guide, maintaining visible display of the first alignment guide; and when the user gesture substantially deviates from the first alignment guide, terminating visible display of the first alignment guide.

In accordance with some embodiments, a computing device includes a display, one or more user input devices, one or more processors, memory, and one or more programs. The one or more programs are stored in the memory and configured to be executed by the one or more processors. The one or more programs include instructions for displaying on the display a user interface including at least one user interface element, wherein the user interface element has an initial aspect ratio, and the user interface element is configured to be resized within the user interface in response to user gestures detected with the one or more user input devices; detecting a user gesture, the user gesture corresponding to a gesture to resize the user interface element within the user interface, wherein the user gesture includes one or more directional movements within the user interface; in response to detecting the user gesture: visibly displaying in conjunction with the user interface element at least a first resize handle; visibly displaying a first alignment guide that bisects the user interface element and the first resize handle, wherein the first alignment guide includes positions representing different sizes the user interface element can be resized to while maintaining the initial aspect ratio of the user interface element; resizing the user interface element within the user interface in accordance with the user gesture; while resizing the user interface element within the user interface: while the first alignment guide is visibly displayed: when the user gesture is substantially aligned with the first alignment guide, maintaining visible display of the first alignment guide; and when the user gesture substantially deviates from the first alignment guide, terminating visible display of the first alignment guide.

In accordance with some embodiments there is a graphical user interface on a computing device with a display, one or more user input devices, a memory, and one or more processors to execute one or more programs stored in the memory. The graphical user interface includes a user interface including at least one user interface element, wherein the user interface element has an initial aspect ratio, and the user interface element is configured to be resized within the user interface in response to user gestures detected with the one or more user input devices; wherein: a user gesture is detected, the user gesture corresponding to a gesture to resize the user interface element within the user interface, wherein the user gesture includes one or more directional movements within the user interface; in response to detecting the user gesture: at least a first resize handle is visibly displayed in conjunction with the user interface element; a first alignment guide is visibly displayed, wherein the first alignment guide bisects the user interface element and the first resize handle, and the first alignment guide includes positions representing different sizes the user interface element can be resized to while maintaining the initial aspect ratio of the user interface element; the user interface element is resized within the user interface in accordance with the user gesture; while resizing the user interface element within the user interface: while the first alignment guide is visibly displayed: when the user gesture is substantially aligned with the first alignment guide, visible display of the first alignment guide is maintained; and when the user gesture substantially deviates from the first alignment guide, visible display of the first alignment guide is terminated.

In accordance with some embodiments, a computer readable storage medium has stored therein one or more programs, the one or more programs comprising instructions, which when executed by a computing device with a display and one or more user input devices, cause the computing device to: display on the display a user interface including at least one user interface element, wherein the user interface element has an initial aspect ratio, and the user interface element is configured to be resized within the user interface in response to user gestures detected with the one or more user input devices; detect a user gesture, the user gesture corresponding to a gesture to resize the user interface element within the user interface, wherein the user gesture includes one or more directional movements within the user interface; in response to detecting the user gesture: visibly display in conjunction with the user interface element at least a first resize handle; visibly display a first alignment guide that bisects the user interface element and the first resize handle, wherein the first alignment guide includes positions representing different sizes the user interface element can be resized to while maintaining the initial aspect ratio of the user interface element; resize the user interface element within the user interface in accordance with the user gesture; while resizing the user interface element within the user interface: while the first alignment guide is visibly displayed: when the user gesture is substantially aligned with the first alignment guide, maintain visible display of the first alignment guide; and when the user gesture substantially deviates from the first alignment guide, terminate visible display of the first alignment guide.

In accordance with some embodiments, a computing device includes a display; one or more user input devices; and means for displaying on the display a user interface including at least one user interface element, wherein the user interface element has an initial aspect ratio, and the user interface element is configured to be resized within the user interface in response to user gestures detected with the one or more user input devices; means for detecting a user gesture, the user gesture corresponding to a gesture to resize the user interface element within the user interface, wherein the user gesture includes one or more directional movements within the user interface; in response to detecting the user gesture: means for visibly displaying in conjunction with the user interface element at least a first resize handle; means for visibly displaying a first alignment guide that bisects the user interface element and the first resize handle, wherein the first alignment guide includes positions representing different sizes the user interface element can be resized to while maintaining the initial aspect ratio of the user interface element; means for resizing the user interface element within the user interface in accordance with the user gesture; while resizing the user interface element within the user interface: while the first alignment guide is visibly displayed: when the user gesture is substantially aligned with the first alignment guide, means for maintaining visible display of the first alignment guide; and when the user gesture substantially deviates from the first alignment guide, means for terminating visible display of the first alignment guide.

In accordance with some embodiments, an information processing apparatus for use in a computing device includes a display, one or more user input devices, and means for displaying on the display a user interface including at least one user interface element, wherein the user interface element has an initial aspect ratio, and the user interface element is configured to be resized within the user interface in response to user gestures detected with the one or more user input devices; means for detecting a user gesture, the user gesture corresponding to a gesture to resize the user interface element within the user interface, wherein the user gesture includes one or more directional movements within the user interface; in response to detecting the user gesture: means for visibly displaying in conjunction with the user interface element at least a first resize handle; means for visibly displaying a first alignment guide that bisects the user interface element and the first resize handle, wherein the first alignment guide includes positions representing different sizes the user interface element can be resized to while maintaining the initial aspect ratio of the user interface element; means for resizing the user interface element within the user interface in accordance with the user gesture; while resizing the user interface element within the user interface: while the first alignment guide is visibly displayed: when the user gesture is substantially aligned with the first alignment guide, means for maintaining visible display of the first alignment guide; and when the user gesture substantially deviates from the first alignment guide, means for terminating visible display of the first alignment guide.

Thus, the computing devices disclosed herein are provided with faster, more efficient methods and interfaces for managing user interface content and user interface elements, including using aspect ratio locking alignment guides during user interface element resizing gestures. These computing devices with faster, more efficient methods and interfaces increase user effectiveness, efficiency, and satisfaction. Such methods and interfaces may complement or replace conventional methods for manipulating user interface objects.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 5A-5M illustrate exemplary user interfaces for manipulating user interface objects in accordance with some embodiments.

FIGS. 6A-6C are flow diagrams illustrating a method of manipulating user interface objects in accordance with some embodiments.

DESCRIPTION OF EMBODIMENTS

Figure 1A:
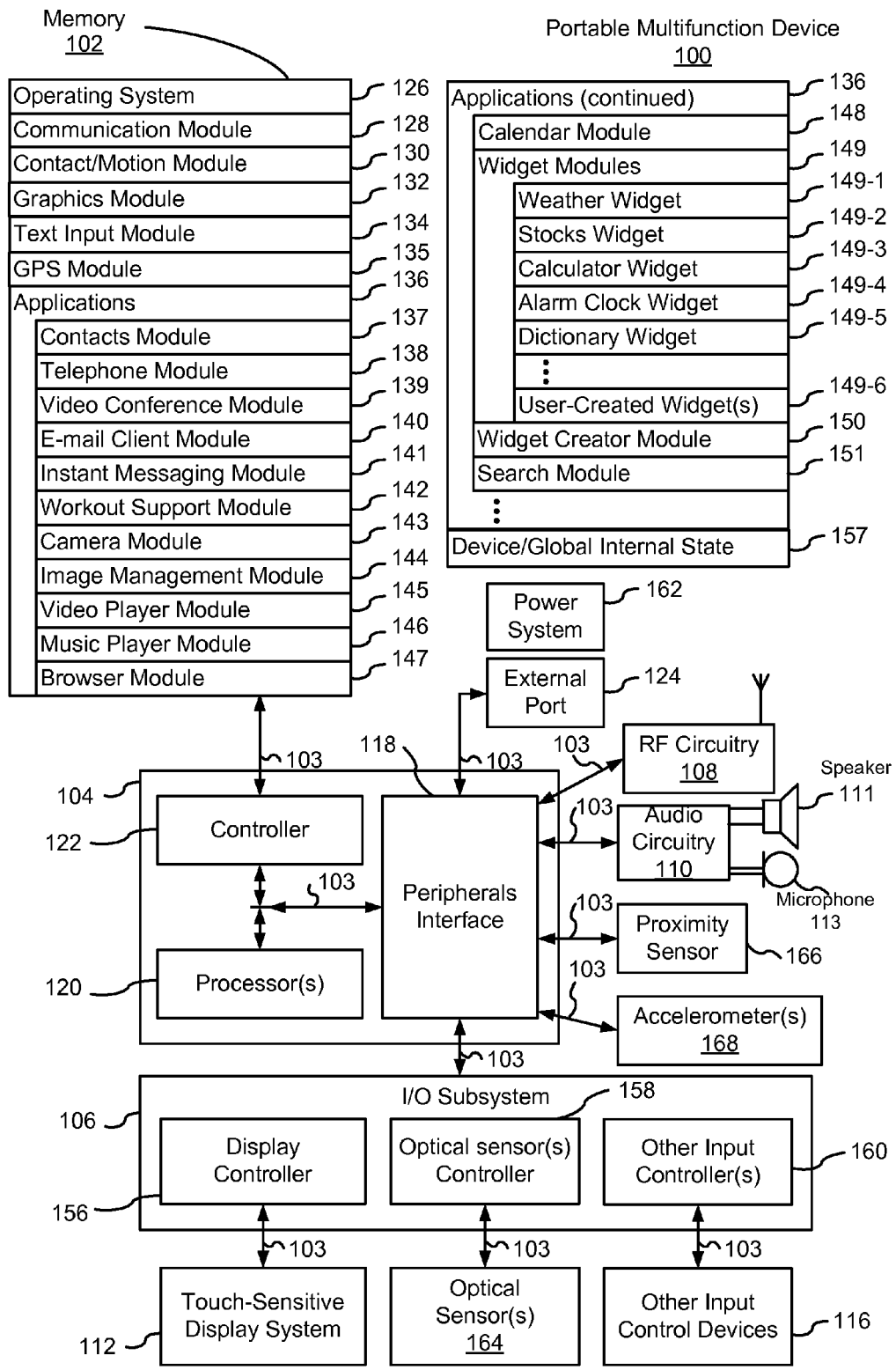
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "resolution" of a display refers to the number of pixels (also called "pixel counts" or "pixel resolution") along each axis or in each dimension of the display. For example, a display may have a resolution of 320×480 pixels. Furthermore, as used herein, the term "resolution" of a multifunction device refers to the resolution of a display in the multifunction device. The term "resolution" does not imply any limitations on the size of each pixel or the spacing of pixels. For example, compared to a first display with a 1024×768-pixel resolution, a second display with a 320×480-pixel resolution has a lower resolution. However, it should be noted that the physical size of a display depends not only on the pixel resolution, but also on many other factors, including the pixel size and the spacing of pixels. Therefore, the first display may have the same, smaller, or larger physical size, compared to the second display.

As used herein, the term "video resolution" of a display refers to the density of pixels along each axis or in each dimension of the display. The video resolution is often measured in a dots-per-inch (DPI) unit, which counts the number of pixels that can be placed in a line within the span of one inch along a respective dimension of the display.

Embodiments of computing devices, user interfaces for such devices, and associated processes for using such devices are described. In some embodiments, the computing device is a portable communications device, such as a mobile telephone, that also contains other functions, such as PDA and/or music player functions. Exemplary embodiments of portable multifunction devices include, without limitation, the iPhone® and iPod Touch® devices from Apple Inc. of Cupertino, Calif. Other portable devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. Nos. 11/459,606, "Keyboards For Portable Electronic Devices," filed Jul. 24, 2006, and 11/459,615, "Touch Screen Keyboards For Portable Electronic Devices," filed Jul. 24, 2006, the contents of which are hereby incorporated by reference in their entireties. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
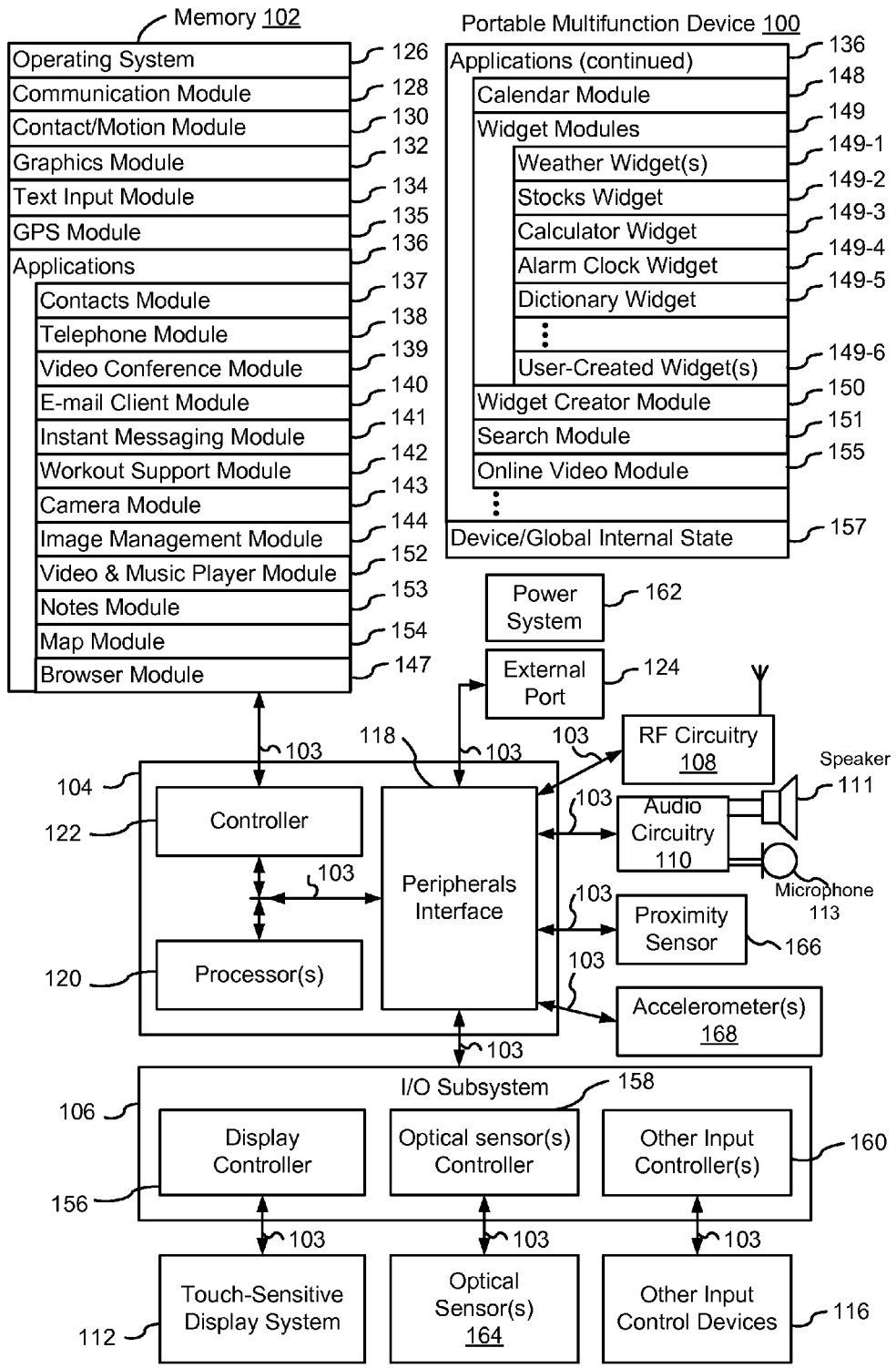

Attention is now directed toward embodiments of portable devices with touch-sensitive displays. FIGS. 1A and 1B are block diagrams illustrating portable multifunction devices 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2). A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. Nos. 6,323, 846 (Westerman et al.), 6,570,557 (Westerman et al.), and/or 6,677,932 (Westerman), and/or U.S. Patent Publication 2002/0015024A1, each of which is hereby incorporated by reference in its entirety. However, touch screen 112 displays visual output from portable device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

In some embodiments, device 100 may include a physical or virtual wheel (e.g., a click wheel) as input control device 116. A user may navigate among and interact with one or more graphical objects (e.g., icons) displayed in touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by input controller 160 as well as one or more of the modules and/or sets of instructions in memory 102. For a virtual click wheel, the click wheel and click wheel controller may be part of touch screen 112 and display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIGS. 1A and 1B show an optical sensor coupled to optical sensor controller 158 in I/O subsystem 106. Optical sensor 164 may include a charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. Nos. 11/241,839, "Proximity Detector In Handheld Device"; 11/240,788, "Proximity Detector In Handheld Device"; 11/620,702, "Using Ambient Light Sensor To Augment Proximity Sensor Output"; 11/586,862, "Automated Response To And Sensing Of User Activity In Portable Devices"; and 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 2005/0190059, "Acceleration-based Theft Detection System for Portable Electronic Devices," and U.S. Patent Publication No. 2006/0017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
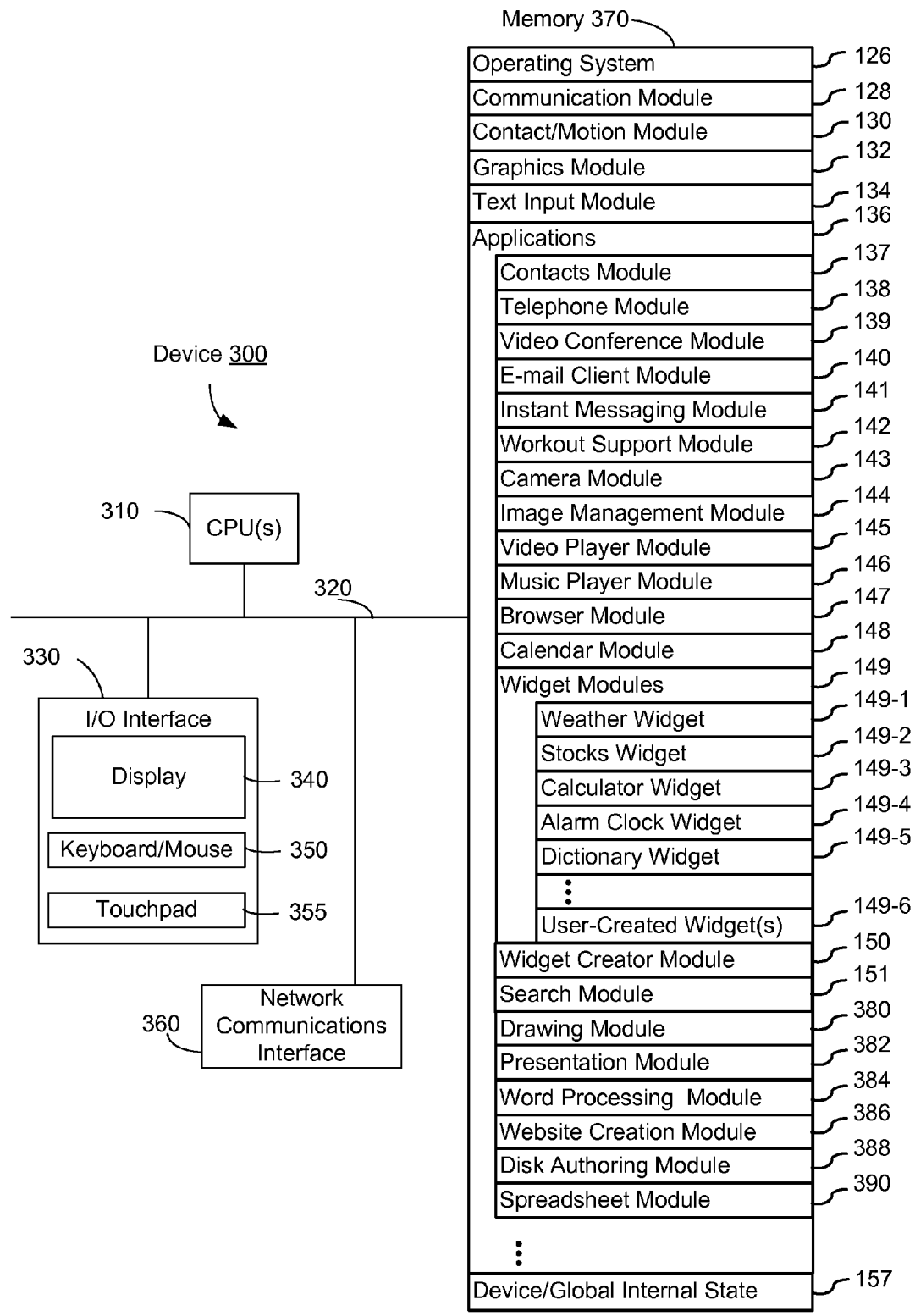
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module 145;
- music player module 146;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player, such as an iPod (trademark of Apple Inc.).

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1C:
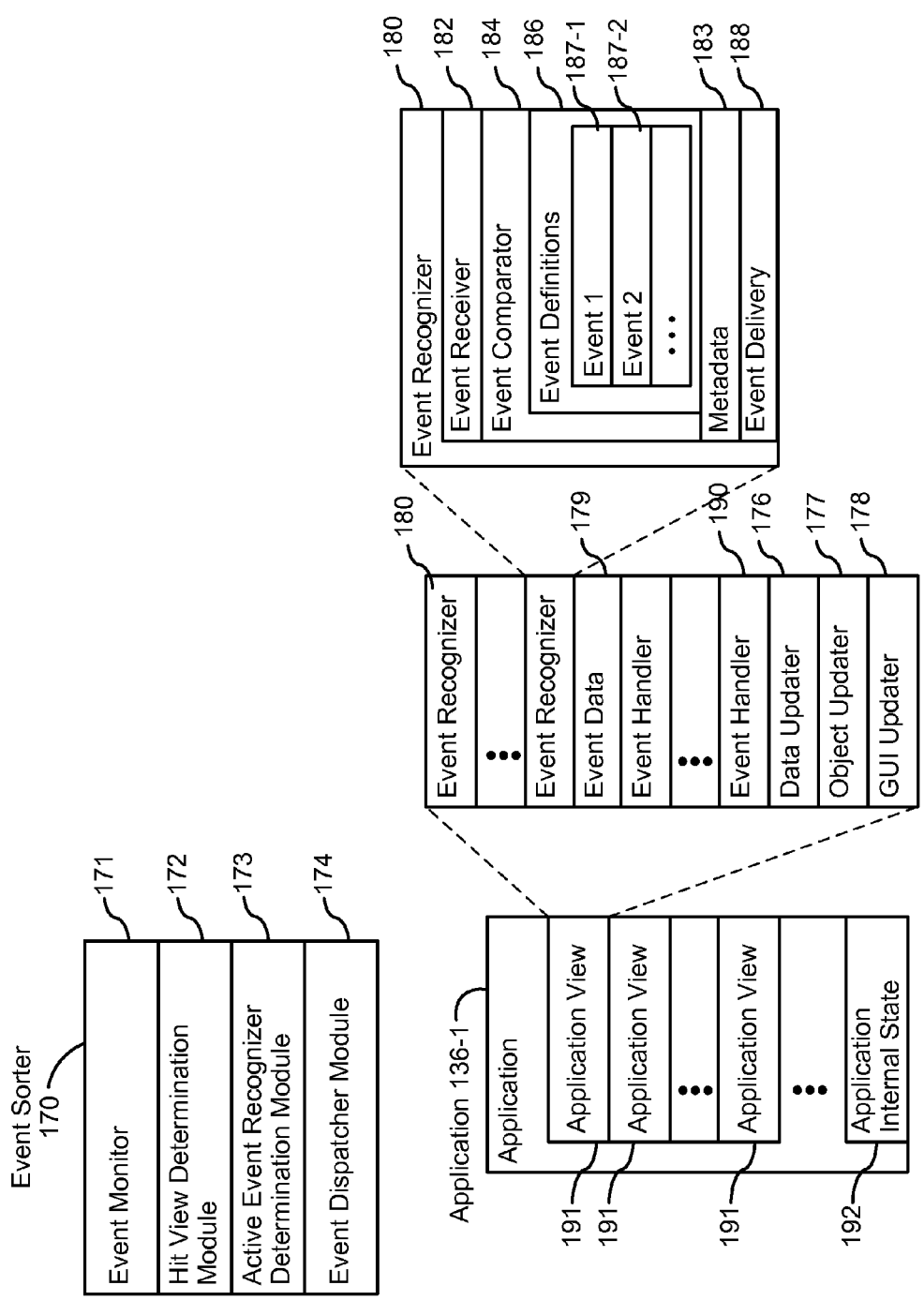
FIG. 1C is a block diagram illustrating exemplary components for event handling in accordance with some embodiments.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input beyond a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes one or more application views 191, each of which includes instructions for handling touch events that occur within a respective view of the application's user interface. Each application view 191 of the application 136-1 includes one or more event recognizers 180 and one or more event handlers 190. Typically, a respective application view 191 includes a plurality of event recognizers 180 and a plurality of event handlers 190. In other embodiments, one or more of event recognizers 180 are part of a separate module, such as a user interface kit (not shown) or a higher level object from which application 136-1 inherits methods and other properties. In some embodiments, a respective application view 191 also includes one or more of: data updater 176, object updater 177, GUI updater 178, and/or event data 179 received from event sorter 170.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for the event's associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible or event cancel state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 includes sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multi-function devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
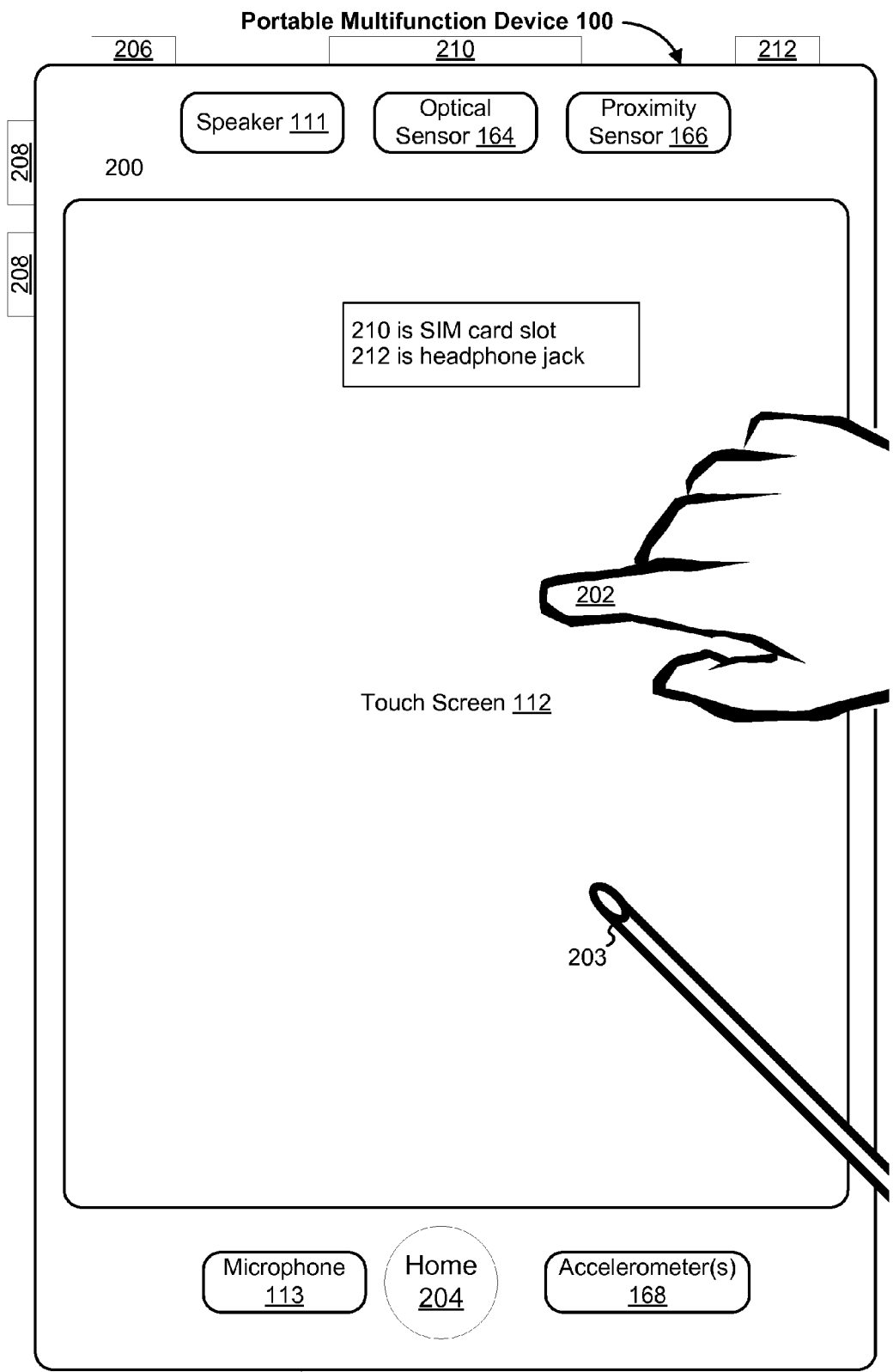
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
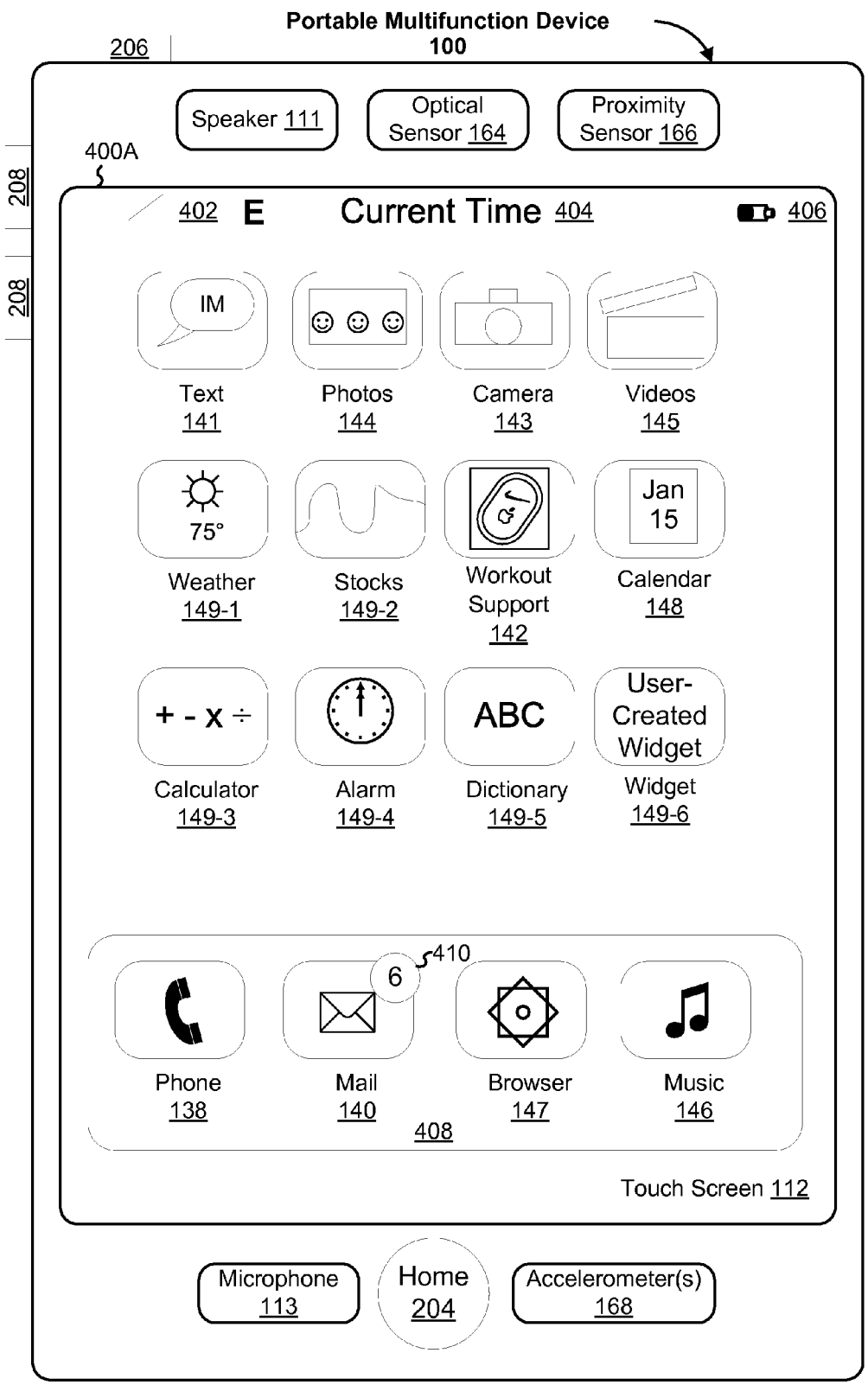
FIGS. 4A and 4B illustrate exemplary user interfaces for a menu of applications on a portable multifunction device in accordance with some embodiments.
Figure 4B:
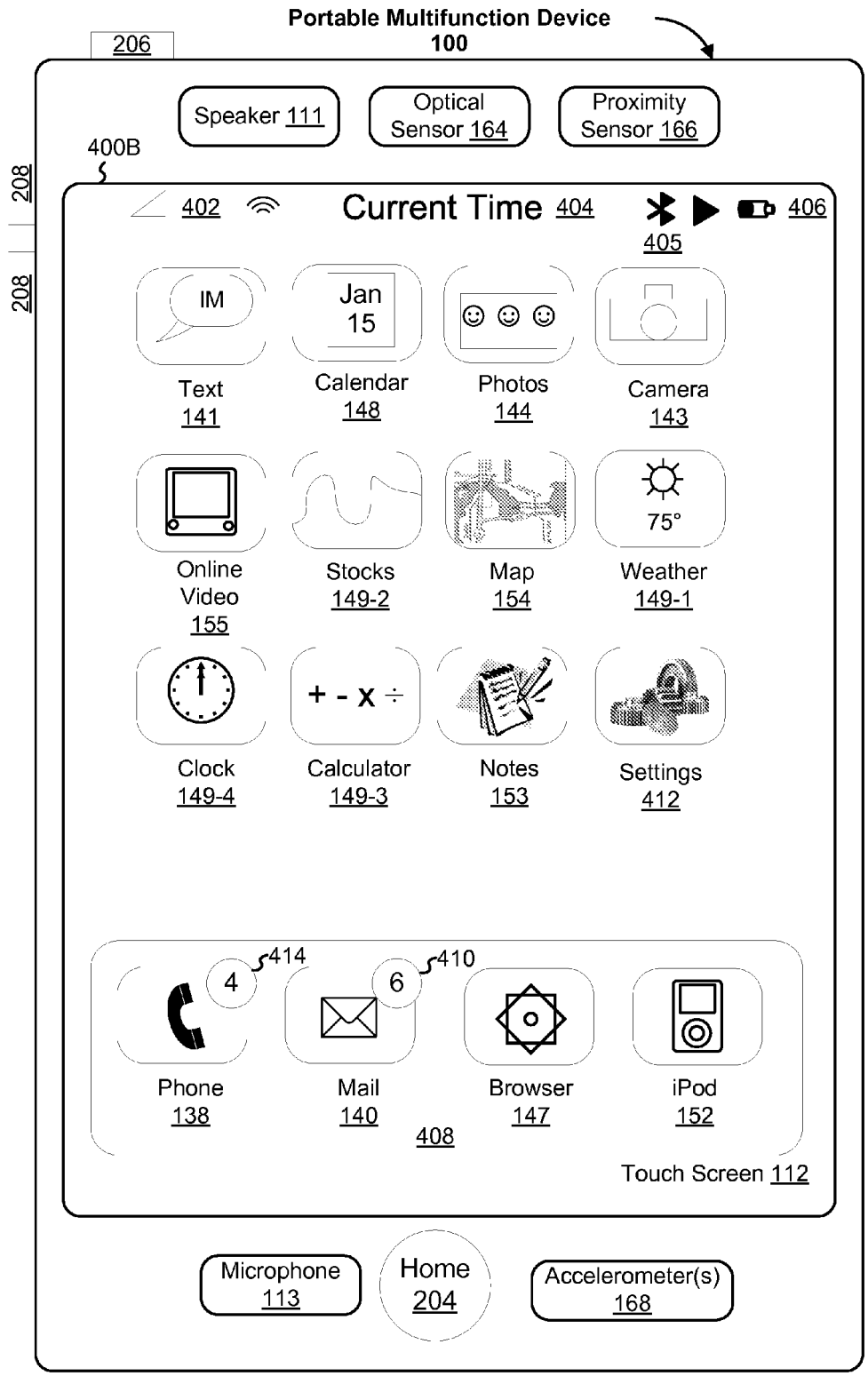

FIGS. 4A and 4B illustrate exemplary user interfaces for a menu of applications on portable multifunction device 100 in accordance with some embodiments. Similar user interfaces may be implemented on device 300. In some embodiments, user interface 400A includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Phone 138, which may include an indicator 414 of the number of missed calls or voicemail messages;
  - E-mail client 140, which may include an indicator 410 of the number of unread e-mails;
  - Browser 147; and
  - Music player 146; and
- Icons for other applications, such as:
  - IM 141;
  - Image management 144;
  - Camera 143;
  - Video player 145;
  - Weather 149-1;
  - Stocks 149-2;
  - Workout support 142;
  - Calendar 148;
  - Calculator 149-3;
  - Alarm clock 149-4;
  - Dictionary 149-5; and
  - User-created widget 149-6.

In some embodiments, user interface 400B includes the following elements, or a subset or superset thereof:

- 402, 404, 405, 406, 141, 148, 144, 143, 149-3, 149-2, 149-1, 149-4, 410, 414, 138, 140, and 147, as described above;
- Map 154;
- Notes 153;
- Settings 412, which provides access to settings for device 100 and its various applications 136, as described further below;
- Video and music player module 152, also referred to as iPod (trademark of Apple Inc.) module 152; and
- Online video module 155, also referred to as YouTube (trademark of Google Inc.) module 155.

Figure 4C:
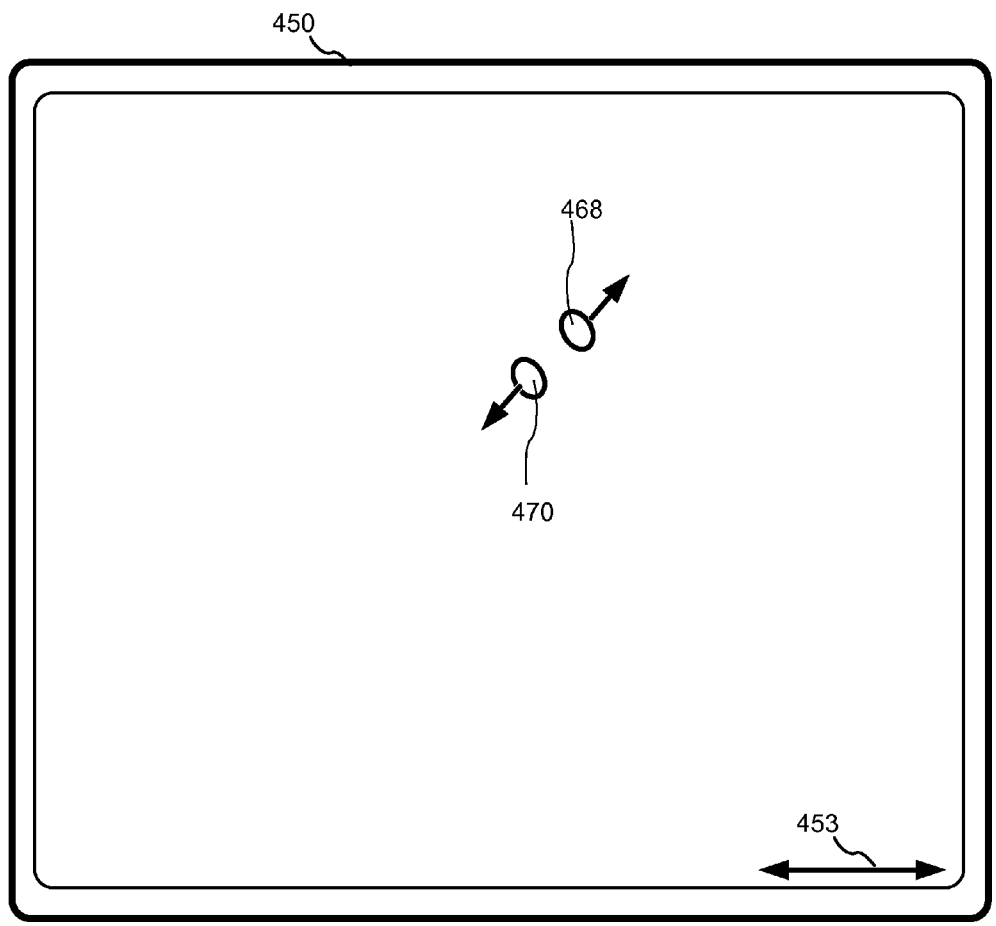
FIG. 4C illustrates an exemplary user interface for a multifunction device with a touch-sensitive surface that is separate from the display in accordance with some embodiments.
Figure 4C:
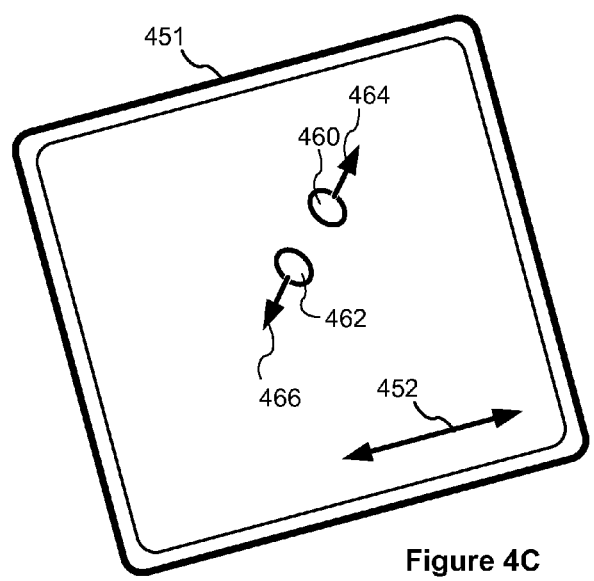

FIG. 4C illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470). In this way, user inputs (e.g., contacts 460 and 462, and movements thereof) detected by the device on the touch-sensitive surface (e.g., 451 in FIG. 4C) are used by the device to manipulate the user interface on the display (e.g., 450 in FIG. 4C) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

Figure 5A:
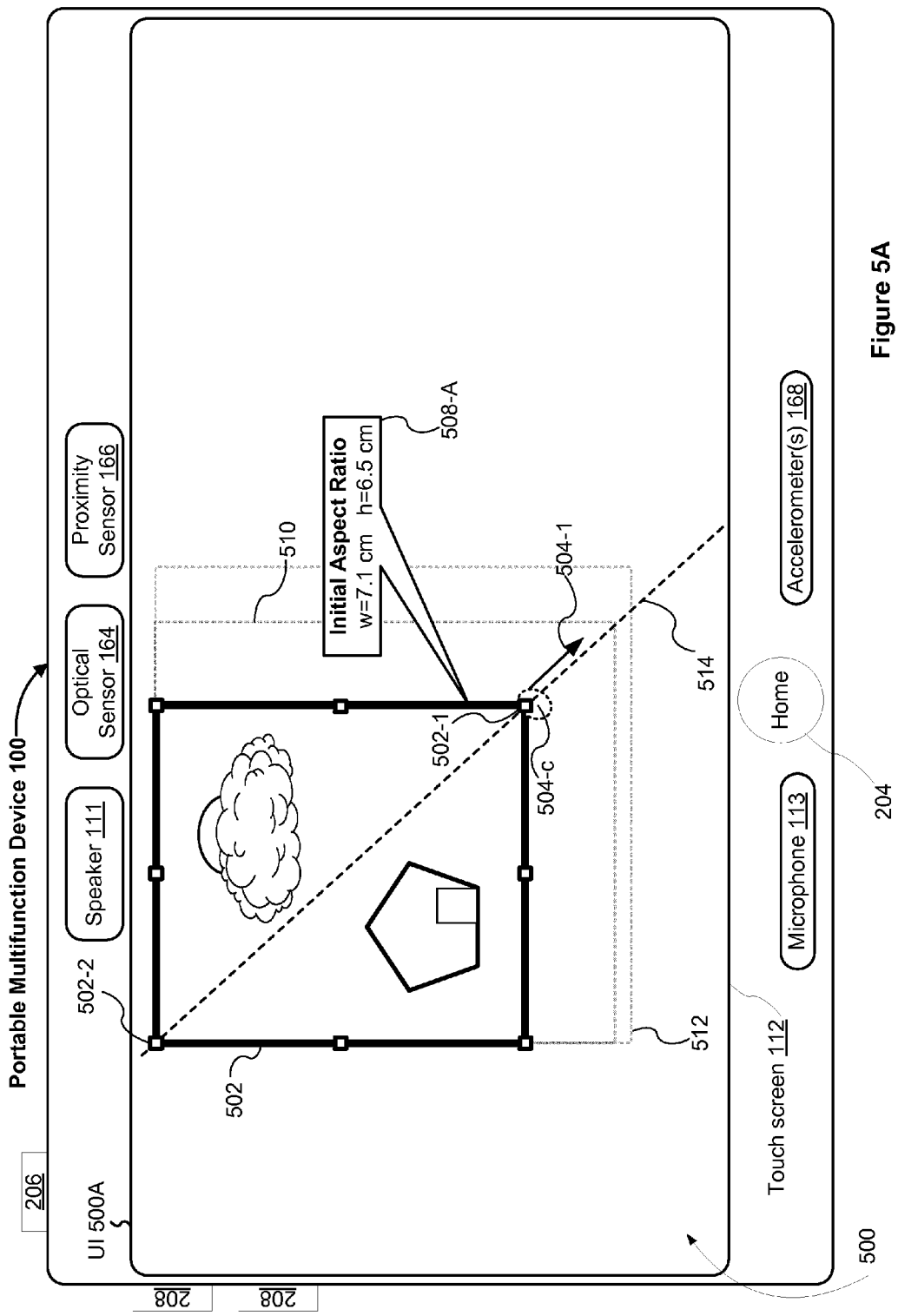

Attention is now directed towards embodiments of user interfaces ("UI") and associated processes that may be implemented on a computing device with a display and a touch-sensitive surface, such as portable multifunction device 100 of FIG. 1A, 4A, or 5A, or device 300 of FIG. 3.

FIGS. 5A-5M illustrate exemplary user interfaces for manipulating user interface objects using aspect ratio locking alignment guides during user interface element resizing gestures in accordance with some embodiments. The user interfaces in these figures are used to illustrate the processes described below, including the processes in FIGS. 6A-6C.

UI 500A (FIG. 5A) illustrates a detected user gesture 504 including contact 504-c and resizing motion 504-1, where contact 504-c is at visibly displayed resize handle 502-1 of currently selected user interface element 502, which in this example is a drawing. User interface element 502 also has other resize handles, including visibly displayed second resize handle 502-2. In the exemplary embodiment of UI 500A, user interface element 502 can be resized in response to user gestures. In this example, user interface element 502 has an initial aspect ratio, and for purposes of illustration, initial aspect ratio outline 510 of user interface element 502 is depicted in the figure, as well as 1:1 aspect ratio outline 512. User interface element 502 is displayed on electronic canvas 500.

Affordance 508-A is configured to display information about user interface element 502; specifically, in this example, element 502's aspect ratio and current size.

Further, as user interface element 502 is resized, some alignment guides corresponding to predetermined aspect ratios may be visibly displayed during the resize gesture. In the example of UI 500A, first alignment guide 514 is visibly displayed in conjunction with user interface element 502. First alignment guide 514 bisects user interface element 502 and first resize handle 502-1, wherein first alignment guide 514 includes positions representing different sizes the user interface element can be resized to while maintaining the initial aspect ratio of the user interface element.

UI 500A also illustrates that detected user gesture 504 is substantially aligned with first alignment guide 514, i.e., user gesture 504 is currently moving in a direction generally corresponding to or approximately parallel with first alignment guide 514.

UI 500B (FIG. 5B) illustrates that while user interface element 502 was resized in response to user gesture 504 in UI 500A, visible display of first alignment guide 514 is maintained. Affordance 508-B has been updated to reflect the current size of user interface element 502.

UI 500B also illustrates that detected user gesture 504 substantially deviates from first alignment guide 514, i.e., user gesture 504 is currently moving in a direction away from first alignment guide 514; specifically, in this example, resizing motion 504-2 of user gesture 504 is moving towards the upper right in the direction of 1:1 aspect ratio outline 512.

UI 500C (FIG. 5C) illustrates that while user interface element 502 was resized in response to user gesture 504 in UI 500B, visible display of first alignment guide 514 is terminated. Affordance 508-C has been updated to reflect the current size of user interface element 502. User gesture 504's resizing motion 504-3 continues to move in a direction towards the upper right in the direction of 1:1 aspect ratio outline 512.

UI 500D (FIG. 5D) illustrates that user gesture 504 has intersected the axis corresponding to the 1:1 aspect ratio for user interface element 502, and as such, 1:1 aspect ratio alignment guide 516 is visibly displayed in conjunction with user interface element 502. 1:1 aspect ratio alignment guide 516 includes positions representing different sizes user interface element 502 can be resized to while maintaining user interface element 502 in a 1:1 aspect ratio.

Affordance 508-D has been updated to reflect the current size of user interface element 502. Additionally, affordance 508-D has been updated with a description of the user interface element's shape, which in this example, is that user interface element 502 is now in the shape of a square. Affordance 508-D has also been updated with description text to indicate that user interface element 502 is now in a 1:1 aspect ratio. Finally, affordance 508-D has also been updated with a graphic depiction 508-Dg of the user interface element's shape, which in this example, is that user interface element 502 is now in the shape of a square.

UI 500D also illustrates that detected user gesture 504's resizing motion 504-4 substantially deviates from 1:1 aspect ratio alignment guide 516, i.e., user gesture 504 is currently moving in a direction away from 1:1 aspect ratio alignment guide 516; specifically, in this example, user gesture 504 continues moving towards the upper right in the direction of 1:1 aspect ratio outline 512.

UI 500E (FIG. 5E) illustrates that while user interface element 502 was resized in response to user gesture 504 in UI 500D, visible display of 1:1 aspect ratio alignment guide 516 is terminated. Affordance 508-E has been updated to reflect the current size of user interface element 502.

UI 500E also illustrates that detected user gesture 504's resizing motion 504-5 is currently moving in a direction towards the lower left right in the direction of 1:1 aspect ratio outline 512.

UI 500F (FIG. 5F) illustrates that while user interface element 502 was resized in response to user gesture 504 in UI 500E, 1:1 aspect ratio alignment guide 516 is visibly redisplayed because user gesture 504 intersected the axis corresponding to 1:1 aspect ratio alignment guide 516. Affordance 508-F has been updated to reflect the current size of user interface element 502, as well as indicating that user interface element 502 is a square in 1:1 aspect ratio.

UI 500F also illustrates that detected user gesture 504's resizing motion 504-6 is currently moving in a direction towards the upper right, and is substantially aligned with 1:1 aspect ratio outline 512.

UI 500G (FIG. 5G) illustrates that since user gesture 504 was substantially aligned with 1:1 aspect ratio outline 512 in UI 500F, visible display of the 1:1 aspect ratio alignment guide 516 is maintained, and user interface element 502 was resized in response to user gesture 504 in UI 500F. Affordance 508-G has been updated to reflect the current size of user interface element 502, as well as continuing to indicate that user interface element 502 is a square in 1:1 aspect ratio.

For purposes of illustration, the location of first alignment guide 514 is depicted, though guide 514 is not visibly displayed in UI 500G. Because user interface element 502 is small, and in this example, less than a predefined size of 2 centimeters, 1:1 aspect ratio alignment guide 516 and first alignment guide 514 are quite close together, especially near first resize handle 502-1.

UI 500G also illustrates that user gesture 504's resizing motion 504-7 is moving away from visibly displayed 1:1 aspect ratio alignment guide 516, crossing first alignment guide 514, but not deviating from 1:1 aspect ratio alignment guide 516 by more than predefined distance 509-d.

UI 500H (FIG. 5H) illustrates that in response to user gesture 504 in UI 500G, the resizing of user interface element 502 was confined to 1:1 aspect ratio alignment guide 516, despite the fact that user gesture 504 crossed first alignment guide 514. This is because user gesture 504 did not deviate from 1:1 aspect ratio alignment guide 516 by more than predefined distance 509-d. This behavior accounts for the fact that when a user interface element is small, it is difficult for a user to easily select a desired alignment guide since they are so close together. This problem is especially acute when dealing with finger-based gestures on touch-sensitive surfaces. In some embodiments, the predefined distance may be based on the width of a user's finger. In some embodiments, the device may track the size of a user's finger contacts being used for gestures on a touch-sensitive surface, and the device increases or decreases the predefined distance based on the size of the user's finger contacts.

In UI 500H, affordance 508-H has been updated to reflect the current size of user interface element 502, as well as continuing to indicate that user interface element 502 is a square in 1:1 aspect ratio.

In UI 500H, user gesture 504's resizing motion 504-8 continues to cross over first alignment guide 514, and user gesture 504 deviates more than predefined distance threshold 509-d away from 1:1 aspect ratio alignment guide 516.

UI 500I (FIG. 5I) illustrates that user interface element 502 was resized in response to user gesture 504 in UI 500H, and visible display of 1:1 aspect ratio alignment guide 516 is terminated. Though not explicitly depicted, contact 504-c is lifted off touch screen 112 in UI 500I.

UI 500J (FIG. 5J) illustrates move gesture 520, and UI 500K (FIG. 5K) illustrates that in response to gesture 520, user interface element 502 has been moved.

UI 500K also illustrates user gesture 522, with point of contact 522-c at first resize handle 502-1.

Affordance 524-K is configured to display information about user interface element 502; specifically, in this example, element 502's aspect ratio and current size. Further, first alignment guide 526 is visibly displayed in conjunction with user interface element 502.

While detecting user gesture 522's contact 522-c, second user gesture 528 is detected, with point of contact 528-c. Center resize affordance 530 is also displayed. After detecting second user gesture 528, user gesture 522's resizing motion 522-1 moves towards the lower right, substantially aligned with first alignment guide 526.

Though not explicitly depicted in UI 500K, contact 528-c is lifted off touch screen 112 after user interface element 502's resizing is completed.

UI 500L (FIG. 5L) illustrates that in response to detecting user gesture 522 and second user gesture 528 in UI 500K, user interface element 502 is resized in accordance with user gesture 522 as modified by second user gesture 528. Specifically, in this example, user interface element 502 is resized with respect to the center of user interface element 502, the resizing being performed along first alignment guide 526. As user gesture 522 was moving away from the center of user interface element 502, the perimeter of user interface element 502 expands with respect to the center of user interface element 502, while the first resize handle 502-1 and second resize handle 502-2 remain on first alignment guide 526.

Though not depicted, if user gesture 522 was moving toward the center of user interface element 502, the perimeter of user interface element 502 would contract towards the center of user interface element 502.

In UI 500L, affordance 524-L has been updated to reflect the current size of user interface element 502. Though not explicitly depicted in UI 500L, contact 522-c is lifted off touch screen 112.

UI 500M (FIG. 5M) illustrates that after user gesture 522 is complete, display of the resize handles, first alignment guide 526, and affordance 524 is terminated.

In some embodiments, the following method is used to manipulate user interface objects with aspect ratio locking alignment guides:

An object is displayed on an electronic canvas, the object having an initial aspect ratio.

A user begins a resize gesture on the object, where the resize gesture includes a point of contact at a first corner resize handle of the object.

In response to detecting initiation of the resize gesture, a first alignment guide is visibly displayed, where the first alignment guide bisects the user interface element and the first corner resize handle, e.g., the first alignment guide intersects the first corner resize handle that corresponds to the point of contact and a second corner resize handle opposite the first corner resize handle.

During the resize gesture, an affordance to display updated object dimensions is displayed proximate to the point of contact, and the following behaviors are supported while detecting movement of the point of contact:

While the first alignment guide is still being visibly displayed, and when the point of contact continues moving substantially in the direction of the first alignment guide, the first alignment guide remains visibly displayed.

While the first alignment guide is still being visibly displayed, and when the point of contact moves substantially away from the first alignment guide, visible display of the first alignment guide is terminated.

After visible display of the first alignment guide is terminated, when the point of contact moves within a predefined distance threshold to a 1:1 alignment guide (which is not being visibly displayed), the 1:1 alignment guide is visibly displayed.

While the 1:1 alignment guide is visibly displayed, when the point of contact moves substantially away from the 1:1 alignment guide, visible display of the 1:1 alignment guide is terminated.

After visible display of the 1:1 alignment guide is terminated, when the point of contact moves within a predefined distance threshold to the first alignment guide (which is not being visibly displayed), the first alignment guide is visibly displayed.

Thus, either the first alignment guide or the 1:1 alignment guide is displayed when the point of contact intersects the axis representing the initial aspect ratio or the 1:1 aspect ratio for the object, respectively.

When the object is resized to a set of predefined proportions, e.g. a square, a circle, the affordance is updated to indicate the object shape. The affordance may also be updated with text, such as "square" or "circle," or a pictorial representation of the object.

When the object has been resized so that it is less than a predefined size, the first alignment guide and the 1:1 alignment guide are close together, making inadvertent reselection of an undesired alignment guide more likely. In this case, the alignment guides may be "sticky" so that a user has to move a larger distance away from the current alignment guide to move on to the other alignment guide. For example, if a resize gesture is currently aligned with the first alignment guide representing initial aspect ratio, and the user wants to orient the gesture with the 1:1 alignment guide, the user has to make a somewhat larger movement to reorient the gesture from the first alignment guide to the 1:1 alignment guide.

In some embodiments, when the object being resized is an image, e.g., a digital photograph, the aspect ratio is locked by confining the resizing operation to the first alignment guide, which corresponds to the initial aspect ratio.

Figure 6B:
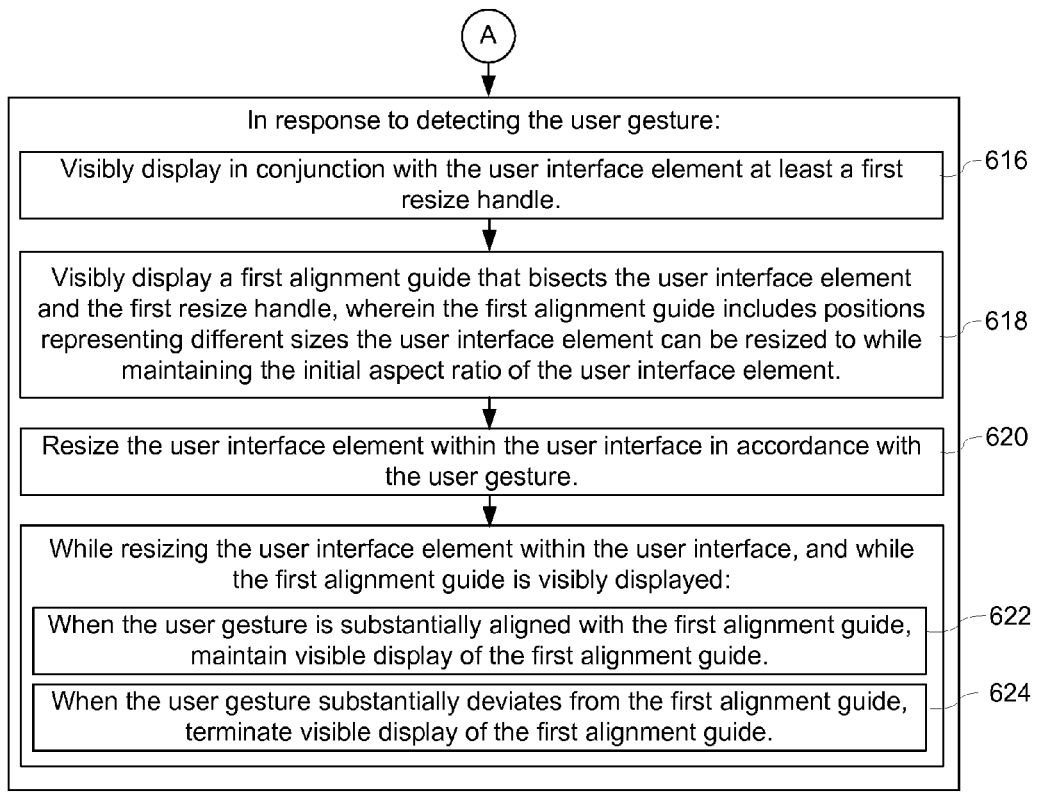
Figure 6B:
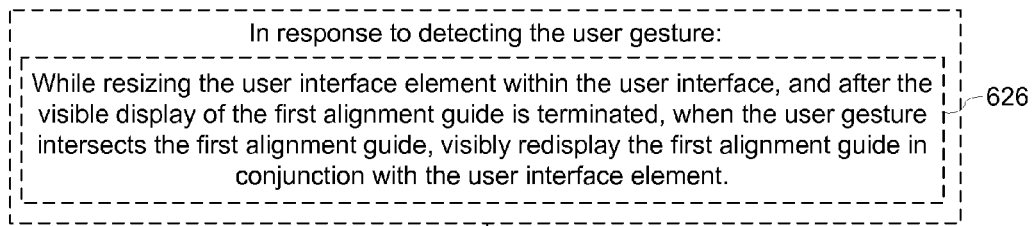

FIGS. 6A-6C are flow diagrams illustrating a method of manipulating user interface objects with aspect ratio locking alignment guides in accordance with some embodiments. The method 600 is performed at a computing device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 provides an intuitive way to manipulate user interface objects. The method reduces the cognitive burden on a user when manipulating user interface objects, thereby creating a more efficient human-machine interface. For battery-operated computing devices, enabling a user to manipulate user interface objects faster and more efficiently conserves power and increases the time between battery charges.

The method 600 is performed at a computing device with a display and one or more user input devices adapted to detect user gestures (e.g., FIG. 5A portable multifunction device 100, FIG. 3 device 300). The device displays on the display a user interface including at least one user interface element, wherein the user interface element has an initial aspect ratio, and the user interface element is configured to be resized or otherwise adjusted within the user interface in response to user gestures detected with the one or more user input devices (602) (e.g., FIG. 5A, user interface element 502 has an initial aspect ratio and resize handles for resizing the user interface element 502 in response to user gestures).

In some embodiments, the user interface element is displayed on an electronic canvas (604) (e.g., FIG. 5A, user interface element 502 is displayed on electronic canvas 500).

In some embodiments, the display and at least one of the one or more user input devices comprise a touch-screen display (606) (e.g., FIG. 5A, touch screen 112).

The device detects a user gesture (e.g., a drag, swipe, pinch, depinch, or any suitable user gesture), the user gesture corresponding to a gesture to resize or otherwise adjust the user interface element within the user interface, wherein the user gesture includes one or more directional movements within the user interface (608) (e.g., FIG. 5A, detected user gesture 504 including contact 504-c and resizing motion 504-1).

In some embodiments, while detecting the user gesture, the device displays an affordance in conjunction with the user interface element being resized, wherein the affordance is configured to display at least a current size of the user interface element (610) (e.g., FIG. 5A, affordance 508-A).

Figure 5B:
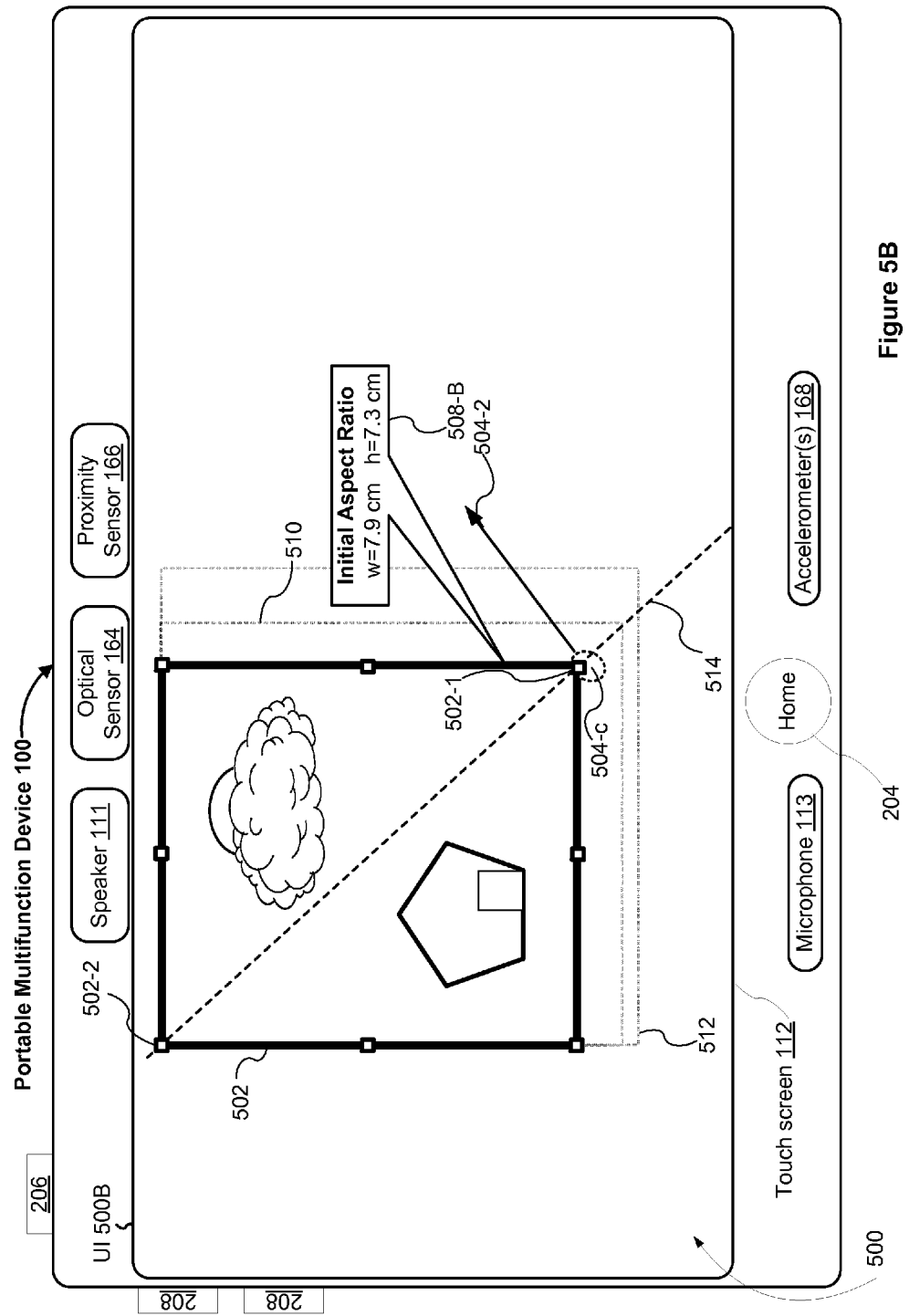
Figure 5C:
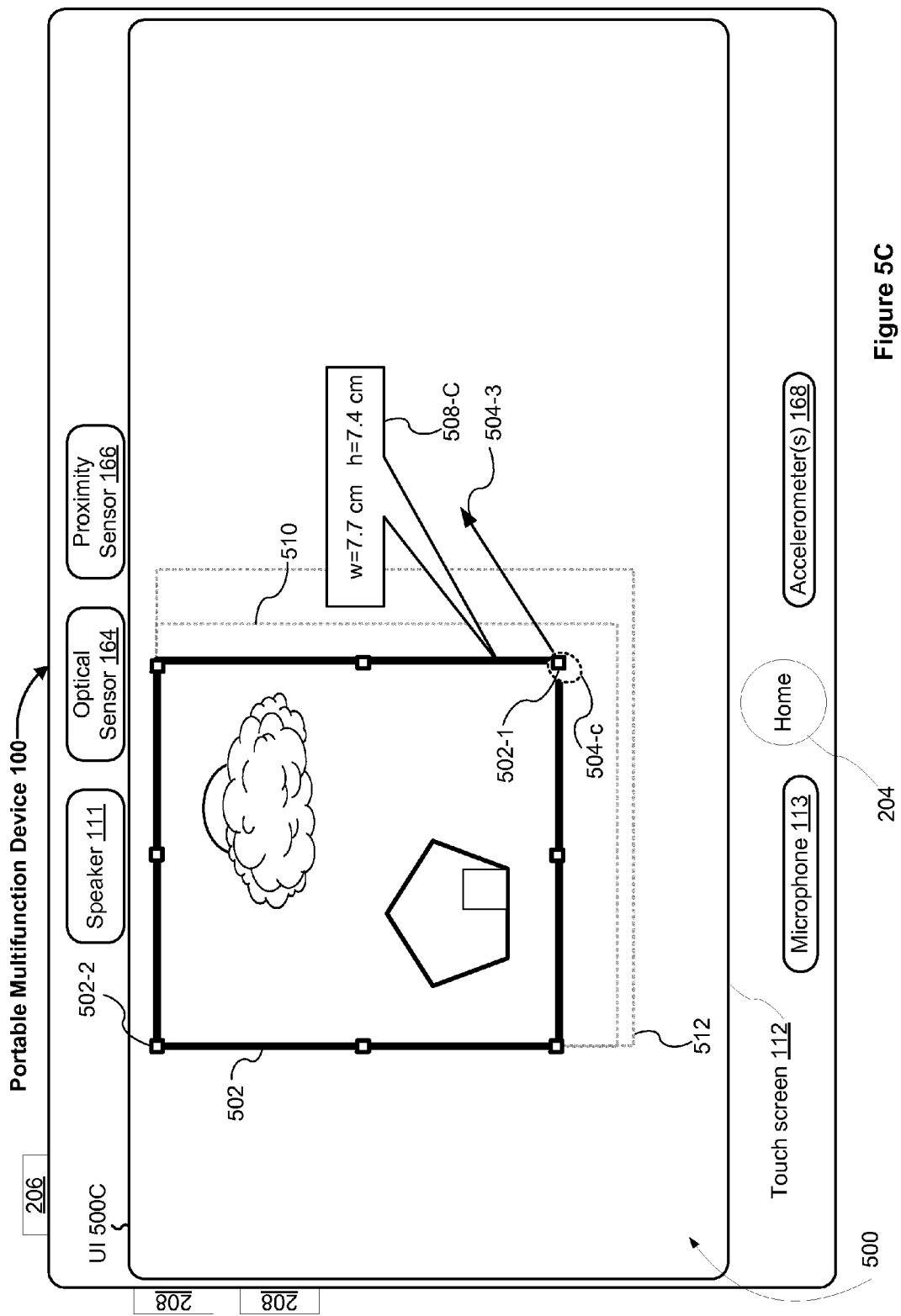
Figure 5D:
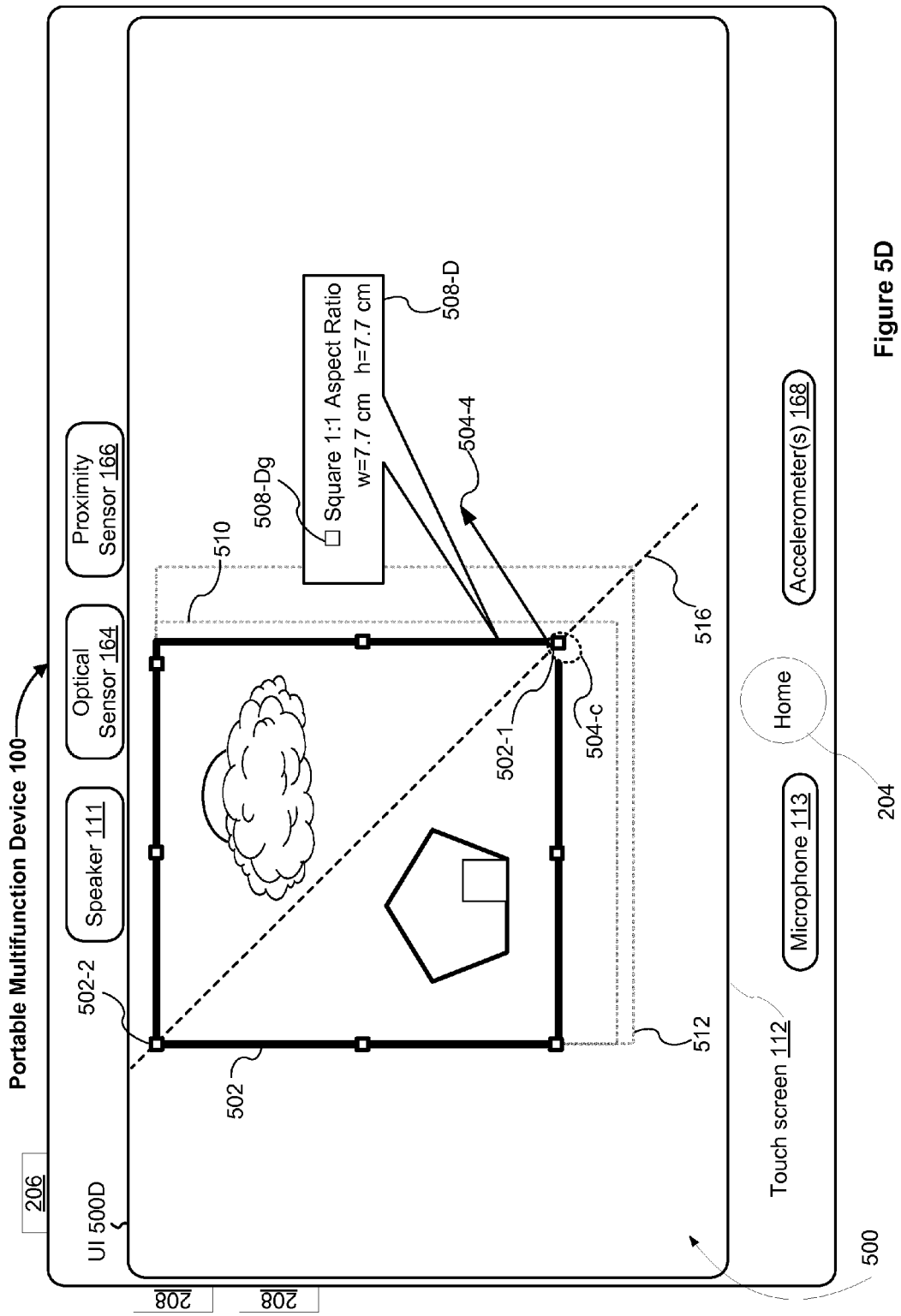
Figure 5E:
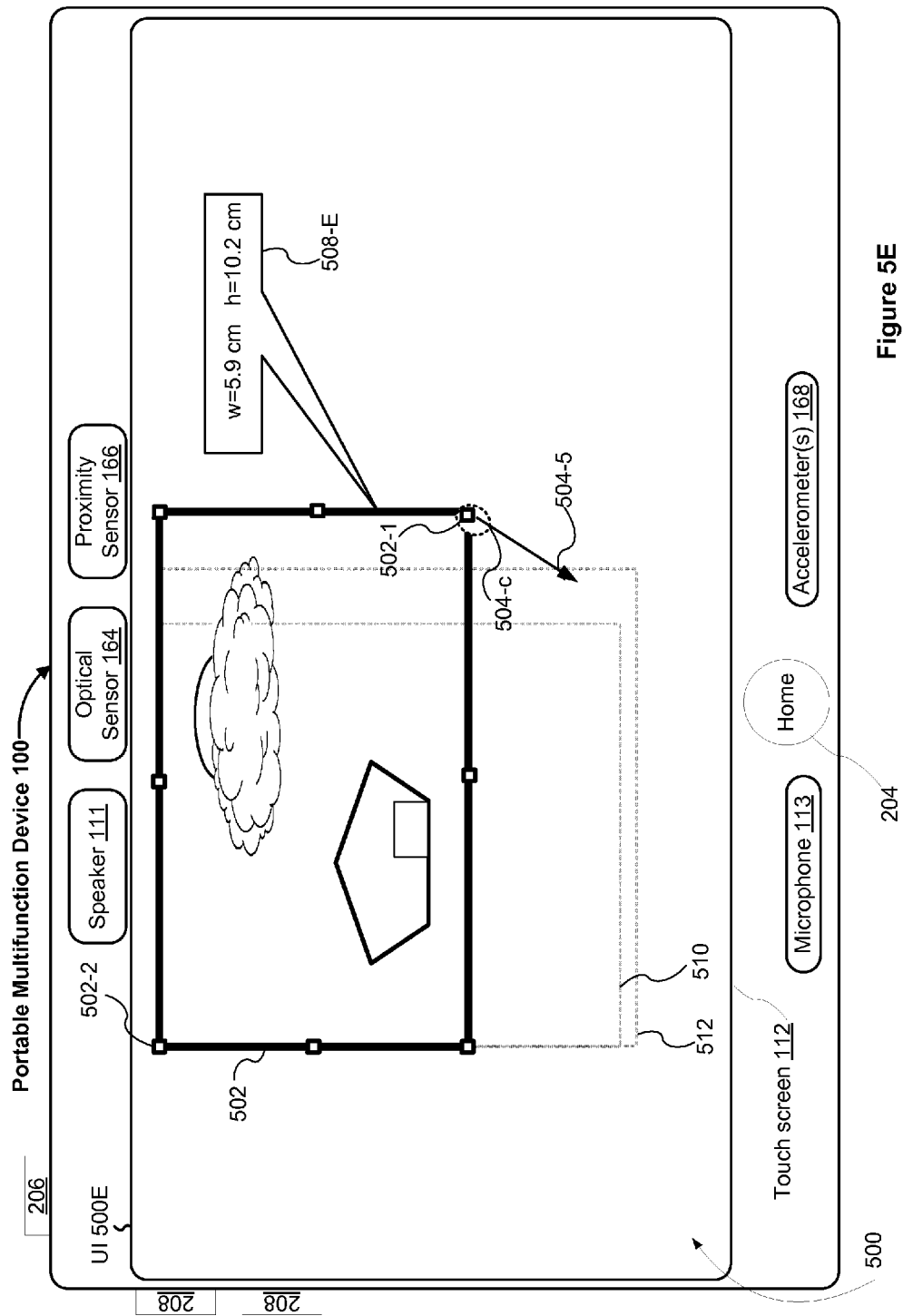

In some embodiments, while detecting the user gesture, the device displays an affordance in conjunction with the user interface element being resized, wherein the affordance is configured to display a description of the user interface element when the user interface element is resized to a set of predefined proportions (612) (e.g., FIG. 5D, affordance 508-D which indicates user interface element 502 is a square with 1:1 aspect ratio).

In some embodiments, while detecting the user gesture, the device displays an affordance in conjunction with the user interface element being resized, wherein the affordance is configured to display a graphic depiction of a specific form of the user interface element when the user interface element is resized to a set of predefined proportions (614) (e.g., FIG. 5D, affordance 508-D which indicates user interface element 502 is a square with 1:1 aspect ratio). In the example of UI 500D of FIG. 5D, the device shows an image of a square in the affordance 508-D when user interface element 502 is a quadrangle in 1:1 aspect ratio.

In some embodiments, when a user interface element is an abstract shape, such as a square or rectangle with rounded corners, and the user interface element is in a 1:1 aspect ratio, the graphic depiction may be a version of the abstract shape in a 1:1 aspect ratio, e.g., a 1:1 aspect ratio square with rounded corners.

In some embodiments, when a user interface element is not in a 1:1 aspect ratio, such as a rectangle with rounded corners, the affordance may not include the graphic depiction of a specific form of the user interface element.

In response to detecting the user gesture, the device visibly displays in conjunction with the user interface element at least a first resize handle (616) (e.g., FIG. 5A visibly displayed resize handle 502-1).

Also in response to detecting the user gesture, the device visibly displays a first alignment guide that bisects the user interface element and the first resize handle, wherein the first alignment guide includes positions representing different sizes the user interface element can be resized to while maintaining the initial aspect ratio of the user interface element (618) (e.g., FIG. 5A, first alignment guide 514 is visibly displayed in conjunction with user interface element 502; first alignment guide 514 bisects user interface element 502 and first resize handle 502-1, and first alignment guide 514 includes positions representing different sizes the user interface element can be resized to while maintaining the initial aspect ratio of the user interface element). In other words, the first alignment guide intersects the first resize handle and a second resize handle opposite the first resize handle. Thus, it necessarily follows that locations on the first alignment guide represent different sizes the object can be resized to while maintaining the initial aspect ratio. Note that in the case of some abstract shapes, an alignment guide that bisects the abstract shape may not be positioned such that equal area is on both sides of the alignment guide, i.e., the bisection of an abstraction shape by an alignment guide may result in two halves of unequal size.

The device resizes or otherwise adjusts the user interface element within the user interface in accordance with the user gesture (620) (e.g., FIG. 5B, user interface element 502 was resized in response to user gesture 504 in FIG. 5A).

While resizing or otherwise adjusting the user interface element within the user interface, and while the first alignment guide is visibly displayed, when the user gesture is substantially aligned with the first alignment guide, the device maintains visible display of the first alignment guide (622) (e.g., FIG. 5B, while user interface element 502 was resized in response to user gesture 504 in FIG. 5A, visible display of first alignment guide 514 is maintained).

While resizing or otherwise adjusting the user interface element within the user interface, and while the first alignment guide is visibly displayed, when the user gesture substantially deviates from the first alignment guide (e.g., the user gesture moves more than a specific distance away from the first alignment guide, i.e., 10 pixels, 15 pixels, 20 pixels, a finger-width, ½ inch, ⅔ inch, 2 centimeters, or any suitable distance), the device terminates visible display of the first alignment guide (624) (e.g., FIG. 5C, while user interface element 502 was resized in response to user gesture 504 in FIG. 5C, visible display of first alignment guide 514 is terminated).

In some embodiments, while resizing or otherwise adjusting the user interface element within the user interface, and after the visible display of the first alignment guide is terminated, when the user gesture intersects the first alignment guide, the device visibly redisplays the first alignment guide in conjunction with the user interface element (626).

In some embodiments, while resizing or otherwise adjusting the user interface element within the user interface, and after the visible display of the first alignment guide is terminated: when the user gesture intersects an axis corresponding to a 1:1 aspect ratio for the user interface element, visibly displaying a 1:1 aspect ratio alignment guide in conjunction with the user interface element, wherein the 1:1 aspect ratio alignment guide includes positions representing different sizes the user interface element can be resized to while maintaining the user interface element in a 1:1 aspect ratio (e.g., FIG. 5D, user gesture 504 intersected the axis corresponding to the 1:1 aspect ratio for user interface element 502 so 1:1 aspect ratio alignment guide 516 is visibly displayed in conjunction with user interface element 502; 1:1 aspect ratio alignment guide 516 includes positions representing different sizes user interface element 502 can be resized to while maintaining user interface element 502 in a 1:1 aspect ratio). While the 1:1 aspect ratio alignment guide is visibly displayed, and when the user gesture is substantially aligned with the 1:1 aspect ratio alignment guide, the device maintains visible display of the 1:1 aspect ratio alignment guide (e.g., FIG. 5G, user gesture 504 in FIG. 5F was substantially aligned with 1:1 aspect ratio outline 512, so visible display of the 1:1 aspect ratio alignment guide 516 is maintained, and user interface element 502 is resized in response to user gesture 504 in FIG. 5F). While the 1:1 aspect ratio alignment guide is visibly displayed, and when the user gesture substantially deviates from the 1:1 aspect ratio alignment guide, the device terminates visible display of the 1:1 aspect ratio alignment guide (e.g., FIG. 5E, while user interface element 502 was resized in response to user gesture 504 in FIG. 5D, visible display of 1:1 aspect ratio alignment guide 516 is terminated because user gesture 504's resizing motion 504-4 substantially deviated from 1:1 aspect ratio alignment guide 516) (628).

Figure 5F:
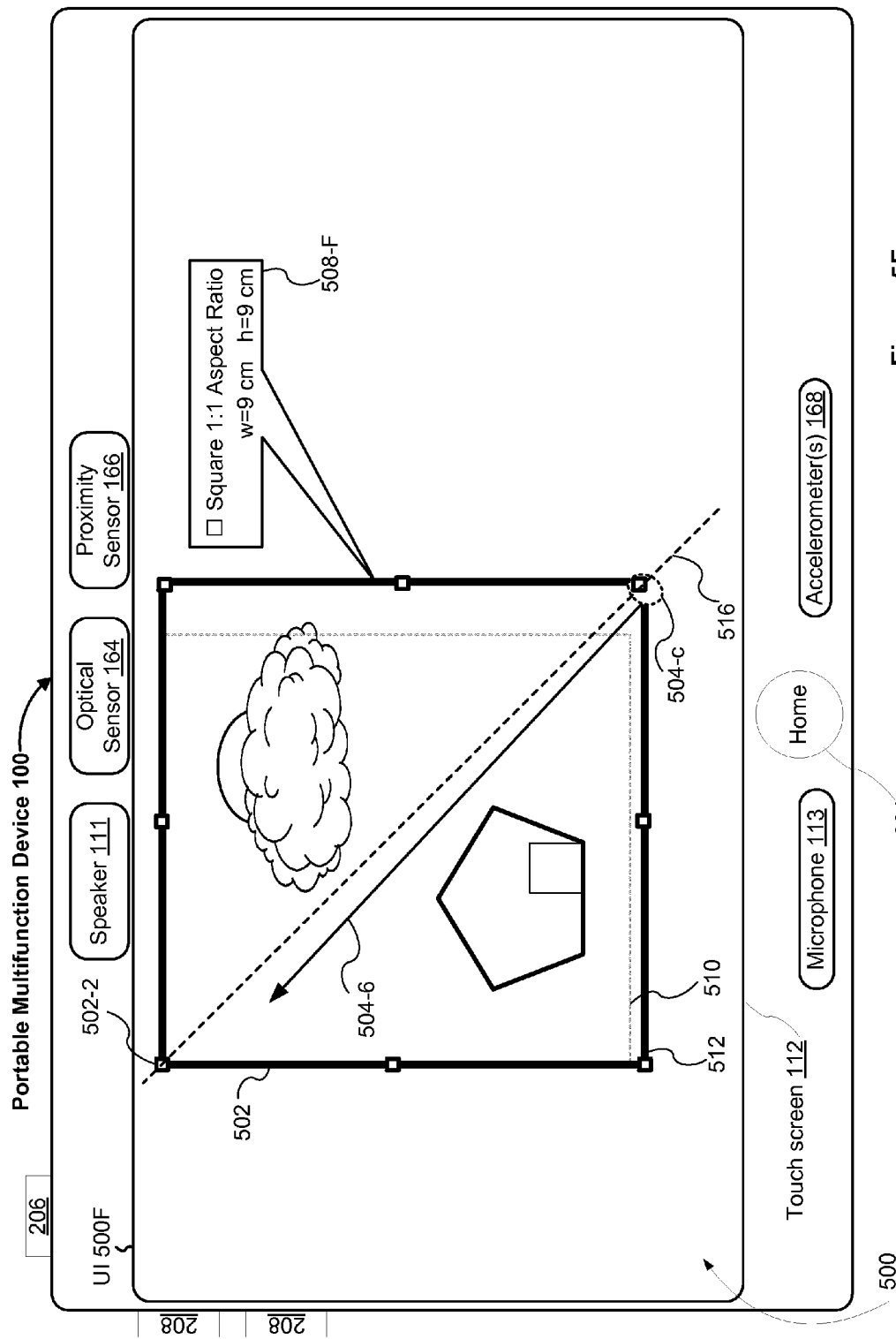

In some embodiments, while resizing or otherwise adjusting the user interface element within the user interface, and after the visible display of the 1:1 aspect ratio alignment guide is terminated, when the user gesture intersects the first alignment guide, the device visibly redisplays the first alignment guide in conjunction with the user interface element; and when the user gesture intersects the 1:1 aspect ratio alignment guide, the device visibly redisplays the 1:1 aspect ratio alignment guide in conjunction with the user interface element (630) (e.g., FIG. 5D, display of 1:1 aspect ratio alignment guide 516 was terminated in FIG. 5D, and 1:1 aspect ratio alignment guide 516 is visibly redisplayed in FIG. 5F because user gesture 504's resizing motion 504-5 intersected the axis corresponding to 1:1 aspect ratio alignment guide 516).

In some embodiments, while the user interface element is less than a predefined size (e.g., 10 pixels, 15 pixels, 20 pixels, a finger-width, ½ inch, ⅔ inch, 2 centimeters, or any suitable distance), and the user gesture is substantially aligned with the first alignment guide, the device confines the resizing of the user interface element to locations on the first alignment guide unless the user gesture deviates more than a predefined distance threshold away from the first alignment guide (i.e., the user gesture moves more than a predefined distance away from the first alignment guide, e.g., 30 pixels, 40 pixels, 50 pixels, one and a half finger-widths, ¾ inch, 1 inch, or any suitable distance, which is generally more than the amount of substantial deviation from an alignment guide to terminate its visible display) (632).

In some embodiments, the predefined distance is the same as the amount of substantial deviation from an alignment guide to terminate its visible display.

Figure 5G:
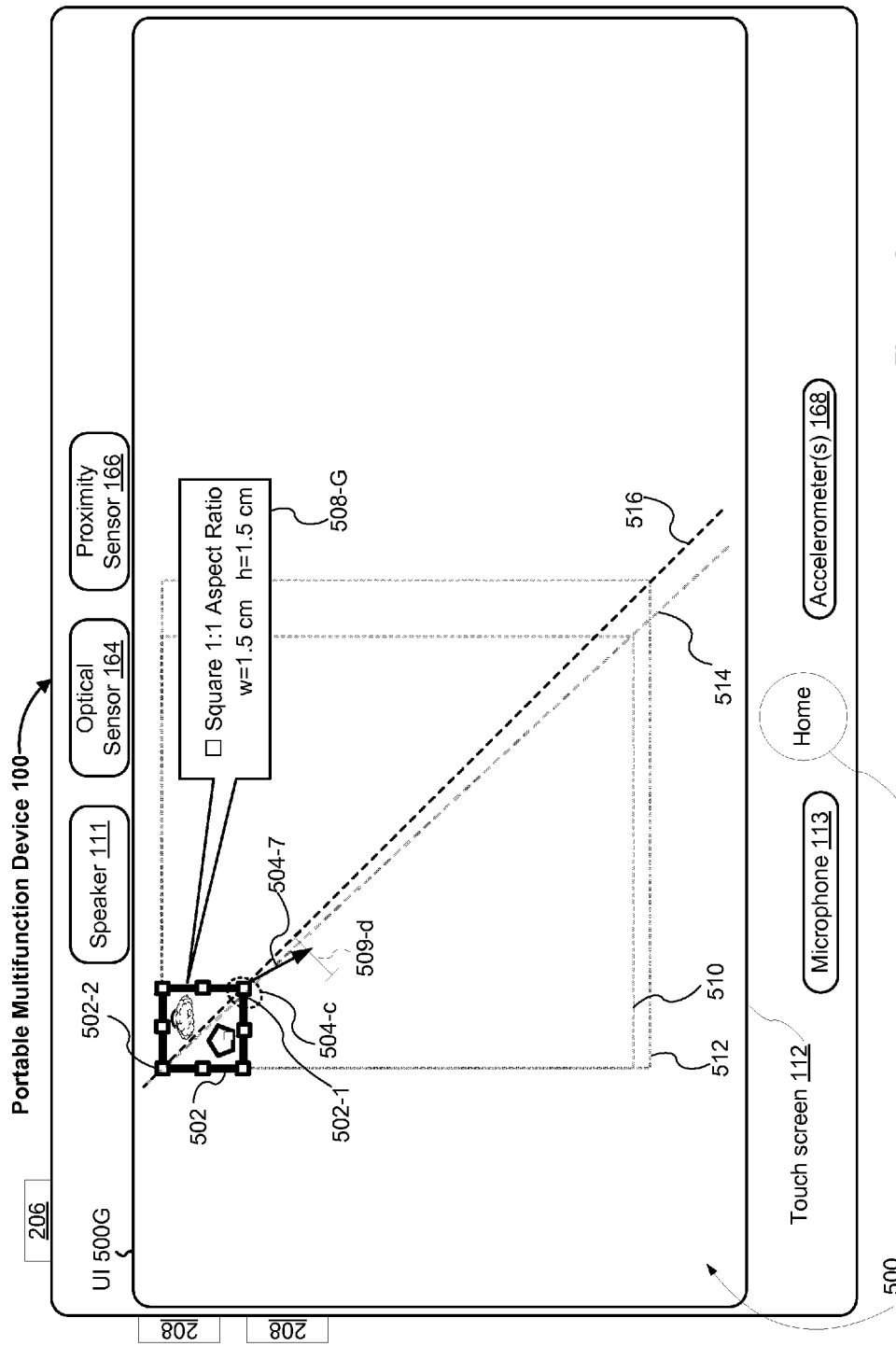
Figure 5H:
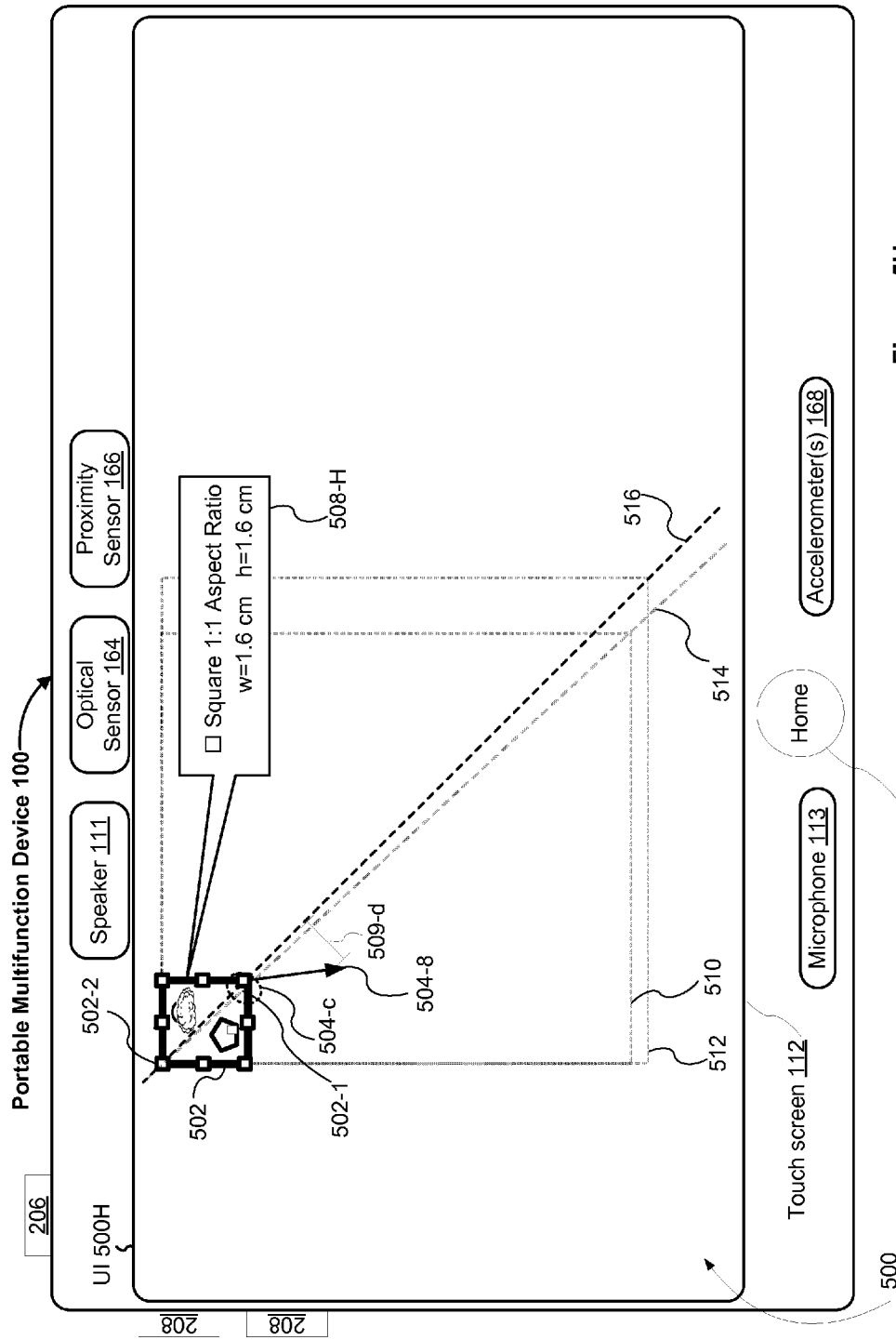
Figure 5I:
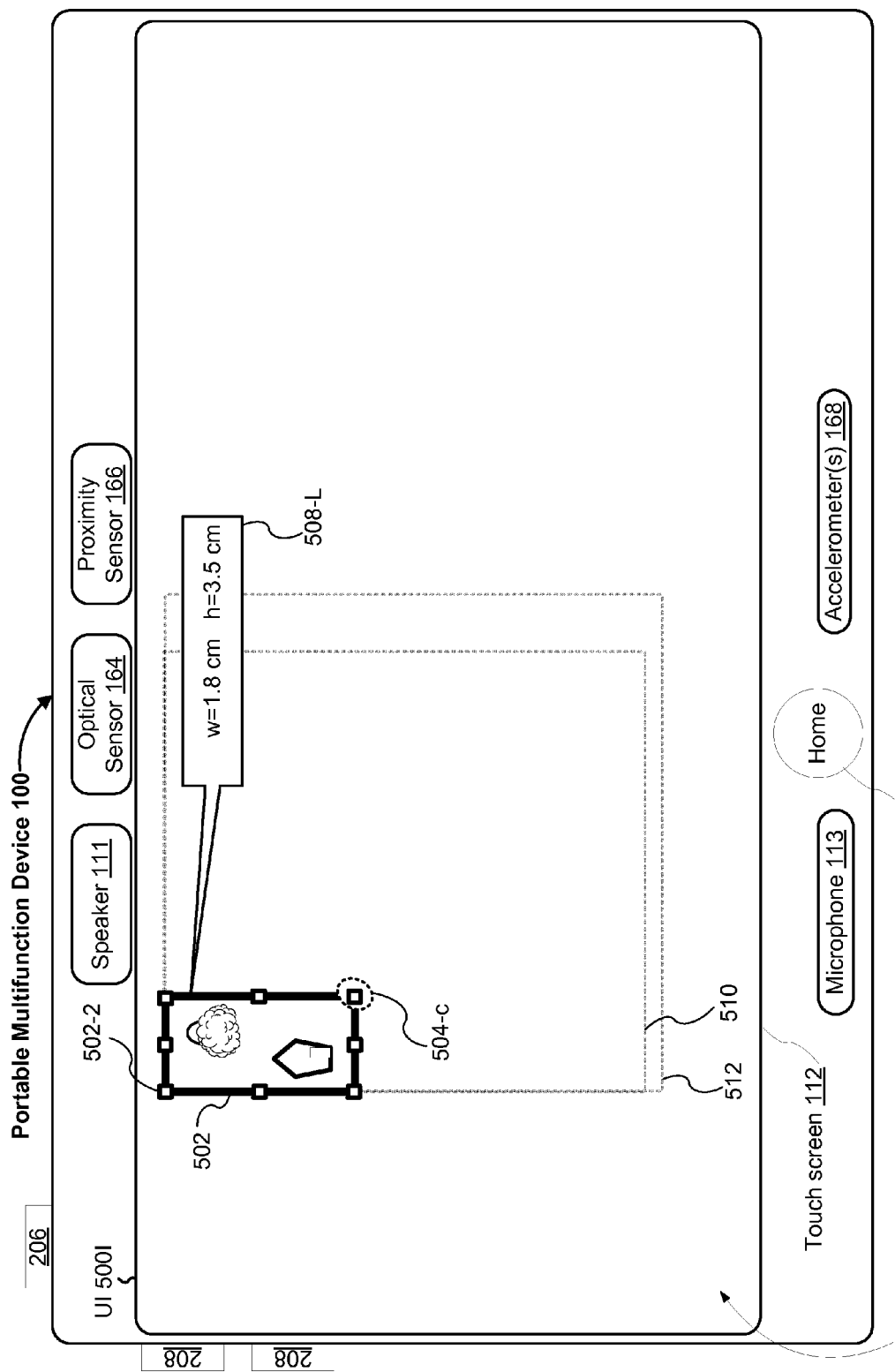
Figure 5L:
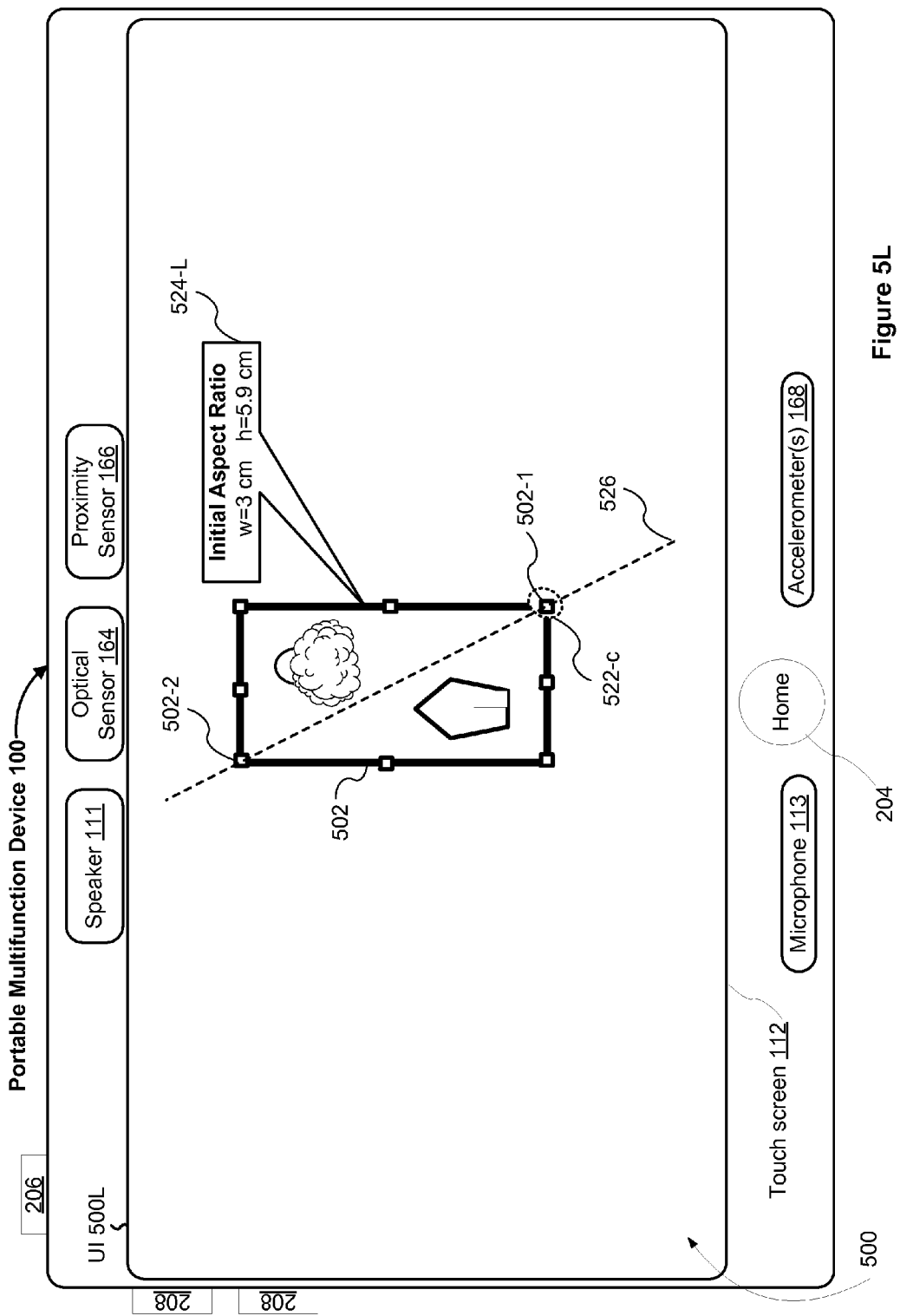
Figure 5M:
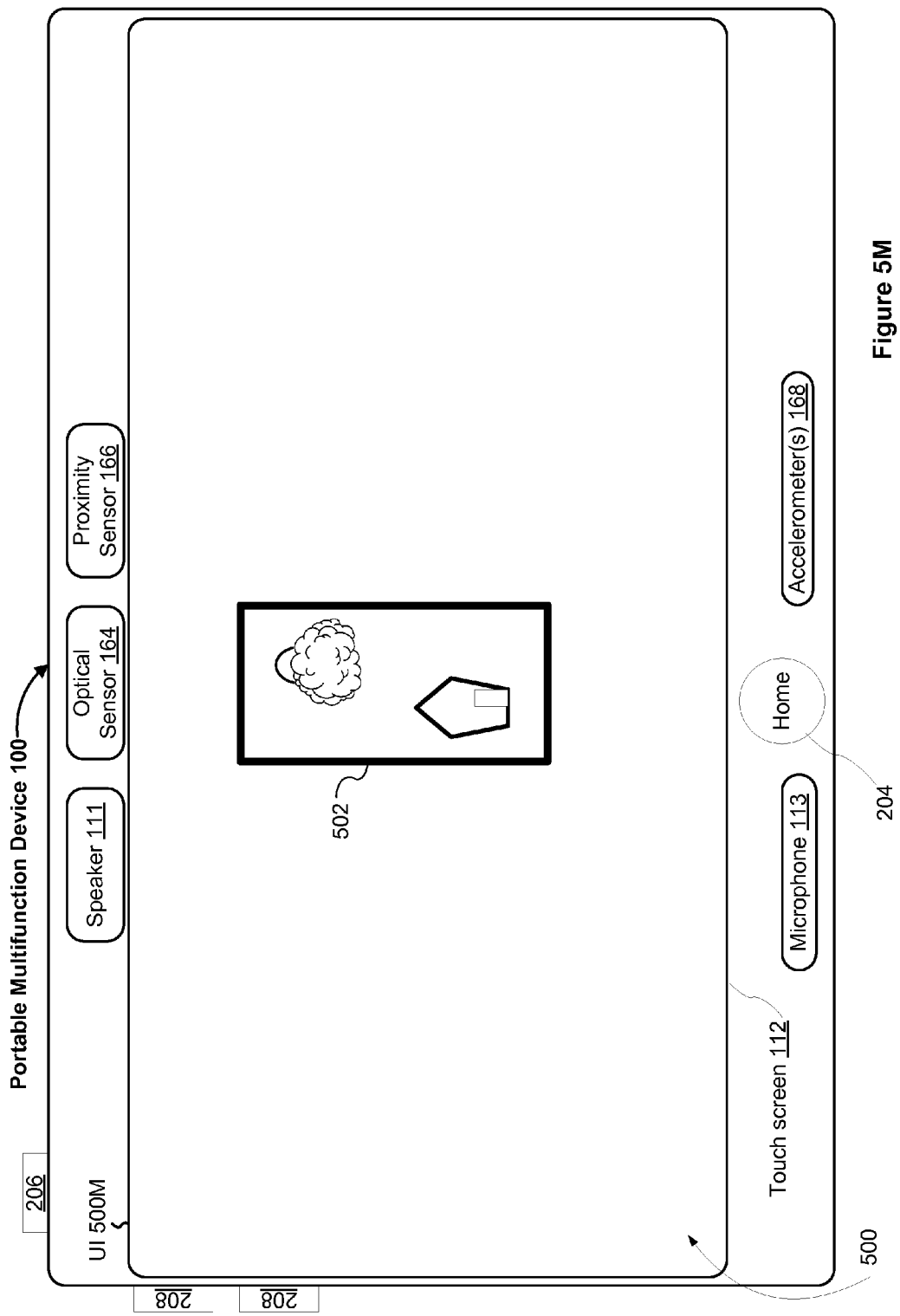

In some embodiments, while the user interface element is less than a predefined size, and the user gesture is substantially aligned with the 1:1 aspect ratio alignment guide, the device confines the resizing of the user interface element to locations on the 1:1 aspect ratio alignment guide unless the user gesture deviates more than a predefined distance threshold away from the 1:1 aspect ratio alignment guide (634) (e.g., FIG. 5H, in response to user gesture 504 in FIG. 5G, the resizing of user interface element 502 was confined to 1:1 aspect ratio alignment guide 516, despite the fact that user gesture 504 crossed first alignment guide 514 but user gesture 504 did not deviate from 1:1 aspect ratio alignment guide 516 by more than predefined distance 509-*d*; FIG. 5H, user gesture 504 deviates more than predefined distance threshold 509-*d* away from 1:1 aspect ratio alignment guide 516, and in FIG. 5I, user interface element 502 was resized in response to user gesture 504 in FIG. 5H, and visible display of 1:1 aspect ratio alignment guide 516 is terminated).

In some embodiments, while the device detects the user gesture, the device detects a second user gesture (e.g., a separate point of contact made by the user away from the user gesture) (e.g., FIG. 5K, while detecting user gesture 522's contact 522-*c*, second user gesture 528 is detected, with point of contact 528-*c*). The device displays a center resize affordance (e.g., FIG. 5K, center resize affordance 530); the device resizes or otherwise adjusts the user interface element within the user interface in accordance with the user gesture, wherein the resizing is performed with respect to a center of the user interface element (e.g., FIG. 5 user interface element 502 is resized with respect to the center of user interface element 502, the resizing being performed along first alignment guide 526) (636).

The steps in the information processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware (e.g., as described above with respect to FIGS. 1A, 1B and 3) are all included within the scope of protection of the invention.

The operations described above with reference to FIGS. 6A-6C may be implemented by components depicted in FIGS. 1A-1C. For example, user gesture direction determinations may be implemented by event sorter 170, event recognizer 180, and event handler 190 by calculating distances and directional data from one or more user gesture events. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 180 associated with the detection of the event or sub-event. Event handler 180 may utilize or call data updater 176 or object updater 177 to update the application internal state 192. In some embodiments, event handler 180 accesses a respective GUI updater 178 to update what is displayed by the application. Similarly, it would be clear to a person having ordinary skill in the art how other processes can be implemented based on the components depicted in FIGS. 1A-1C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:
1. A method, comprising:
 at a computing device with a display and one or more user input devices adapted to detect user gestures:
  displaying on the display a user interface including at least one user interface element, wherein:
   the user interface element has an initial aspect ratio, and
   the user interface element is configured to be resized within the user interface in response to user gestures detected with the one or more user input devices;
  detecting a user gesture, the user gesture corresponding to a gesture to resize the user interface element within the user interface, wherein the user gesture includes a contact with a visibly displayed at least a first resize handle in conjunction with the user interface element and one or more directional movements within the user interface;
  in response to detecting the user gesture:
   visibly displaying a first alignment guide that bisects the user interface element and the first resize handle, wherein the first alignment guide includes positions representing different sizes the user interface element can be resized to while maintaining the initial aspect ratio of the user interface element;
   resizing the user interface element within the user interface in accordance with the user gesture;
   while resizing the user interface element within the user interface:
    while the first alignment guide is visibly displayed:
     when the user gesture is substantially aligned with the first alignment guide, maintaining visible display of the first alignment guide; and
     when the user gesture substantially deviates from the first alignment guide, terminating visible display of the first alignment guide;
   while resizing the user interface element within the user interface, and after the visible display of the first alignment guide is terminated:
    when the user gesture intersects an axis corresponding to a 1:1 aspect ratio for the user interface element, visibly displaying a 1:1 aspect ratio alignment guide in conjunction with the user interface element, wherein the 1:1 aspect ratio alignment guide includes positions representing different sizes the user interface element can be resized to while maintaining the user interface element in a 1:1 aspect ratio.
2. The method of claim 1, further comprising:
 while resizing the user interface element within the user interface, and after the visible display of the first alignment guide is terminated:
  when the user gesture intersects the first alignment guide, visibly redisplaying the first alignment guide in conjunction with the user interface element.
3. The method of claim 1, further comprising:
 while the 1:1 aspect ratio alignment guide is visibly displayed:
  when the user gesture is substantially aligned with the 1:1 aspect ratio alignment guide, maintaining visible display of the 1:1 aspect ratio alignment guide; and
  when the user gesture substantially deviates from the 1:1 aspect ratio alignment guide, terminating visible display of the 1:1 aspect ratio alignment guide.
4. The method of claim 3, further comprising:
 while resizing the user interface element within the user interface, and after the visible display of the 1:1 aspect ratio alignment guide is terminated:
  when the user gesture intersects the first alignment guide, visibly redisplaying the first alignment guide in conjunction with the user interface element; and
  when the user gesture intersects the 1:1 aspect ratio alignment guide, visibly redisplaying the 1:1 aspect ratio alignment guide in conjunction with the user interface element.
5. The method of claim 4, further comprising:
 while the user interface element is less than a predefined size, and the user gesture is substantially aligned with the first alignment guide:
  confining the resizing of the user interface element to locations on the first alignment guide unless the user gesture deviates more than a predefined distance threshold away from the first alignment guide.
6. The method of claim 4, further comprising:
 while the user interface element is less than a predefined size, and the user gesture is substantially aligned with the 1:1 aspect ratio alignment guide:
  confining the resizing of the user interface element to locations on the 1:1 aspect ratio alignment guide unless the user gesture deviates more than a predefined distance threshold away from the 1:1 aspect ratio alignment guide.

7. The method of claim 1, further comprising:
while detecting the user gesture:
detecting a second user gesture;
displaying a center resize affordance;
resizing the user interface element within the user interface in accordance with the user gesture, wherein the resizing is performed with respect to a center of the user interface element.

8. The method of claim 1, further comprising while detecting the user gesture, displaying an affordance in conjunction with the user interface element being resized, wherein the affordance is configured to display at least a current size of the user interface element.

9. The method of claim 1, further comprising while detecting the user gesture, displaying an affordance in conjunction with the user interface element being resized, wherein the affordance is configured to display a description of the user interface element when the user interface element is resized to a set of predefined proportions.

10. The method of claim 1, further comprising while detecting the user gesture, displaying an affordance in conjunction with the user interface element being resized, wherein the affordance is configured to display a graphic depiction of a specific form of the user interface element when the user interface element is resized to a set of predefined proportions.

11. The method of claim 1, wherein the user interface element is displayed on an electronic canvas.

12. The method of claim 1, wherein the display and at least one of the one or more user input devices comprise a touch-screen display.

13. A computing device, comprising:
a display;
one or more user input devices adapted to detect user gestures;
one or more processors; memory; and one or more programs, wherein the one or more programs are stored in the memory and configured to be executed by the one or more processors, the one or more programs including instructions for:
displaying on the display a user interface including at least one user interface element, wherein:
the user interface element has an initial aspect ratio, and the user interface element is configured to be resized within the user interface in response to user gestures detected with the one or more user input devices;
detecting a user gesture, the user gesture corresponding to a gesture to resize the user interface element within the user interface, wherein the user gesture includes a contact with a visibly displayed at least a first resize handle in conjunction with the user interface element and one or more directional movements within the user interface;
in response to detecting the user gesture:
visibly displaying a first alignment guide that bisects the user interface element and the first resize handle, wherein the first alignment guide includes positions representing different sizes the user interface element can be resized to while maintaining the initial aspect ratio of the user interface element;
resizing the user interface element within the user interface in accordance with the user gesture;
while resizing the user interface element within the user interface:
while the first alignment guide is visibly displayed:
when the user gesture is substantially aligned with the first alignment guide, maintaining visible display of the first alignment guide; and
when the user gesture substantially deviates from the first alignment guide, terminating visible display of the first alignment guide;
while resizing the user interface element within the user interface, and after the visible display of the first alignment guide is terminated:
when the user gesture intersects an axis corresponding to a 1:1 aspect ratio for the user interface element, visibly displaying a 1:1 aspect ratio alignment guide in conjunction with the user interface element, wherein the 1:1 aspect ratio alignment guide includes positions representing different sizes the user interface element can be resized to while maintaining the user interface element in a 1:1 aspect ratio.

14. The computing device of claim 13, further comprising the one or more programs including instructions for:
while resizing the user interface element within the user interface, and after the visible display of the first alignment guide is terminated:
when the user gesture intersects the first alignment guide, visibly redisplaying the first alignment guide in conjunction with the user interface element.

15. The computing device of claim 13, further comprising the one or more programs including instructions for:
while the 1:1 aspect ratio alignment guide is visibly displayed:
when the user gesture is substantially aligned with the 1:1 aspect ratio alignment guide, maintaining visible display of the 1:1 aspect ratio alignment guide; and
when the user gesture substantially deviates from the 1:1 aspect ratio alignment guide, terminating visible display of the 1:1 aspect ratio alignment guide.

16. The computing device of claim 15, further comprising the one or more programs including instructions for:
while resizing the user interface element within the user interface, and after the visible display of the 1:1 aspect ratio alignment guide is terminated:
when the user gesture intersects the first alignment guide, visibly redisplaying the first alignment guide in conjunction with the user interface element; and
when the user gesture intersects the 1:1 aspect ratio alignment guide, visibly redisplaying the 1:1 aspect ratio alignment guide in conjunction with the user interface element.

17. The computing device of claim 16, further comprising the one or more programs including instructions for:
while the user interface element is less than a predefined size, and the user gesture is substantially aligned with the first alignment guide:
confining the resizing of the user interface element to locations on the first alignment guide unless the user gesture deviates more than a predefined distance threshold away from the first alignment guide.

18. The computing device of claim 16, further comprising the one or more programs including instructions for:
while the user interface element is less than a predefined size, and the user gesture is substantially aligned with the 1:1 aspect ratio alignment guide:
confining the resizing of the user interface element to locations on the 1:1 aspect ratio alignment guide unless the user gesture deviates more than a predefined distance threshold away from the 1:1 aspect ratio alignment guide.

19. A graphical user interface comprising:

a computing device with a display and one or more user input devices adapted to detect user gestures;

a user interface including at least one user interface element, wherein:

the user interface element has an initial aspect ratio, and the user interface element is configured to be resized within the user interface in response to user gestures detected with the one or more user input devices;

wherein:

a user gesture is detected, the user gesture corresponding to a gesture to resize the user interface element within the user interface, wherein the user gesture includes a contact with a visibly displayed at least a first resize handle in conjunction with the user interface element and one or more directional movements within the user interface;

in response to detecting the user gesture:

a first alignment guide is visibly displayed, wherein the first alignment guide bisects the user interface element and the first resize handle, and the first alignment guide includes positions representing different sizes the user interface element can be resized to while maintaining the initial aspect ratio of the user interface element;

the user interface element is resized within the user interface in accordance with the user gesture;

while resizing the user interface element within the user interface:

while the first alignment guide is visibly displayed:

when the user gesture is substantially aligned with the first alignment guide, visible display of the first alignment guide is maintained; and when the user gesture substantially deviates from the first alignment guide, visible display of the first alignment guide is terminated;

while resizing the user interface element within the user interface, and after the visible display of the first alignment guide is terminated:

when the user gesture intersects an axis corresponding to a 1:1 aspect ratio for the user interface element, visibly displaying a 1:1 aspect ratio alignment guide in conjunction with the user interface element, wherein the 1:1 aspect ratio alignment guide includes positions representing different sizes the user interface element can be resized to while maintaining the user interface element in a 1:1 aspect ratio.

20. A computer readable storage medium storing one or more programs, the one or more programs comprising instructions, which when executed by a computing device with a display and one or more user input devices adapted to detect user gestures, cause the device to:

display on the display a user interface including at least one user interface element, wherein:

the user interface element has an initial aspect ratio, and the user interface element is configured to be resized within the user interface in response to user gestures detected with the one or more user input devices;

detect a user gesture, the user gesture corresponding to a gesture to resize the user interface element within the user interface, wherein the user gesture includes a contact with a visibly displayed at least a first resize handle in conjunction with the user interface element and one or more directional movements within the user interface;

in response to detecting the user gesture:

visibly display a first alignment guide that bisects the user interface element and the first resize handle, wherein the first alignment guide includes positions representing different sizes the user interface element can be resized to while maintaining the initial aspect ratio of the user interface element;

resize the user interface element within the user interface in accordance with the user gesture;

while resizing the user interface element within the user interface:

while the first alignment guide is visibly displayed:

when the user gesture is substantially aligned with the first alignment guide, maintain visible display of the first alignment guide; and when the user gesture substantially deviates from the first alignment guide, terminate visible display of the first alignment guide;

while resizing the user interface element within the user interface, and after the visible display of the first alignment guide is terminated:

when the user gesture intersects an axis corresponding to a 1:1 aspect ratio for the user interface element, visibly displaying a 1:1 aspect ratio alignment guide in conjunction with the user interface element, wherein the 1:1 aspect ratio alignment guide includes positions representing different sizes the user interface element can be resized to while maintaining the user interface element in a 1:1 aspect ratio.

* * * * *